(12) United States Patent
Hashiguchi et al.

(10) Patent No.: US 9,602,195 B2
(45) Date of Patent: Mar. 21, 2017

(54) NETWORK DESIGN APPARATUS, NETWORK DESIGN METHOD, AND STORAGE MEDIUM STORING NETWORK DESIGN PROGRAM

(71) Applicant: FUJITSU LIMITED, Kawasaki-shi, Kanagawa (JP)

(72) Inventors: Tomohiro Hashiguchi, Inagi (JP); Yutaka Takita, Kawasaki (JP); Kazuyuki Tajima, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/793,009

(22) Filed: Jul. 7, 2015

(65) Prior Publication Data
US 2016/0036522 A1 Feb. 4, 2016

(30) Foreign Application Priority Data
Jul. 31, 2014 (JP) .................. 2014-155864

(51) Int. Cl.
| | | |
|---|---|---|
| G02F 1/00 | (2006.01) | |
| H04B 10/032 | (2013.01) | |
| H04J 3/16 | (2006.01) | |
| H04J 3/14 | (2006.01) | |
| H04L 12/46 | (2006.01) | |

(52) U.S. Cl.
CPC ............ *H04B 10/032* (2013.01); *H04J 3/14* (2013.01); *H04J 3/1652* (2013.01); *H04L 12/4633* (2013.01); *H04J 2203/006* (2013.01); *H04J 2203/0085* (2013.01)

(58) Field of Classification Search
CPC ....... H04L 45/28; H04L 45/22; H04L 49/552; H04L 43/0811; H04W 4/20
USPC ............................................. 398/2
See application file for complete search history.

(56) References Cited

U.S. PATENT DOCUMENTS

| | | | | |
|---|---|---|---|---|
| 7,609,621 | B1 * | 10/2009 | Kanagala ............... | H04L 45/28 370/227 |
| 2003/0216141 | A1 * | 11/2003 | Antoniou ............... | H04L 45/22 455/450 |
| 2004/0208118 | A1 * | 10/2004 | DeBoer ................... | H04J 3/085 370/223 |
| 2008/0170857 | A1 | 7/2008 | Bardalai | |

FOREIGN PATENT DOCUMENTS

| | | |
|---|---|---|
| JP | 4-263540 | 9/1992 |
| JP | 2003-115872 | 4/2003 |
| JP | 2008-99297 | 4/2008 |

* cited by examiner

*Primary Examiner* — Don N Vo
(74) *Attorney, Agent, or Firm* — Staas & Halsey LLP

(57) ABSTRACT

A network design apparatus includes: a memory; and a processor coupled to the memory and configured to execute: accommodation design processing of, based on a traffic of a protection-applied or protection-unapplied first link in a first layer, generating a protection-unapplied second link in a second layer lower than the first layer, and generating a working path and a protection path of the first link on a network configured of the second link, and protection application processing of, based on the protection-unapplied second link and the working path and the protection path of the first link that are generated in the accommodation design processing, selecting or generating a protection-applied link in the second layer from the protection-unapplied second link.

21 Claims, 25 Drawing Sheets

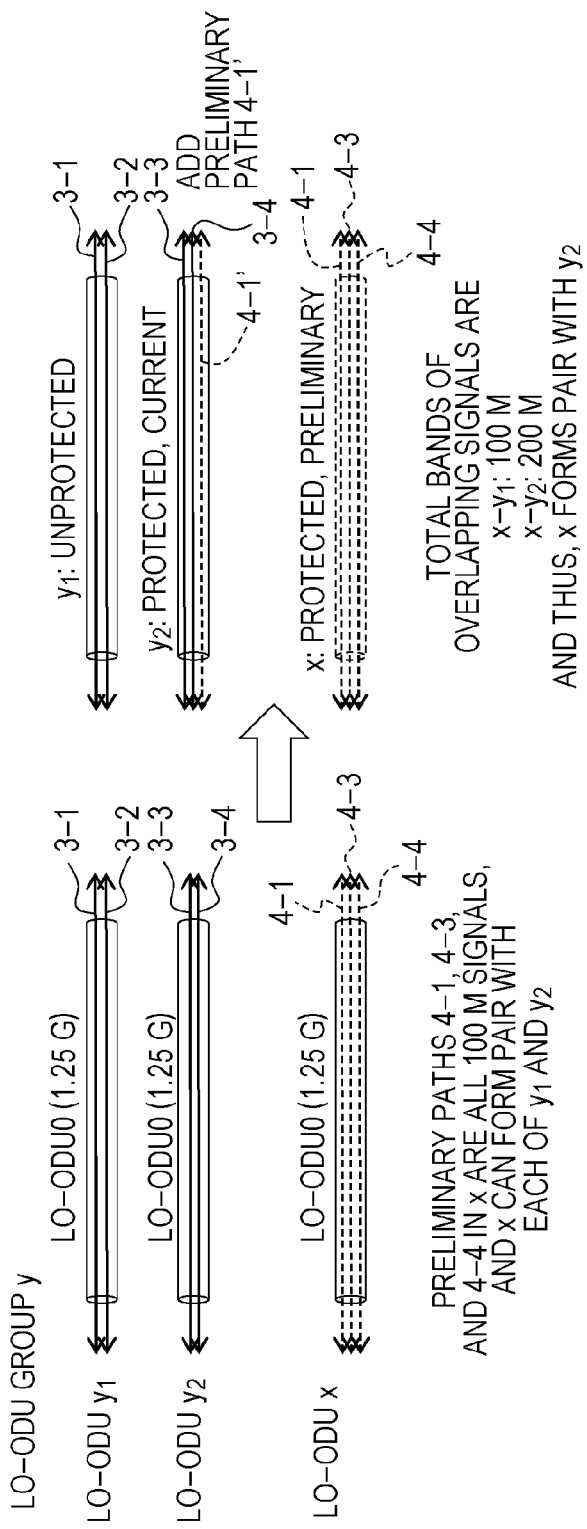

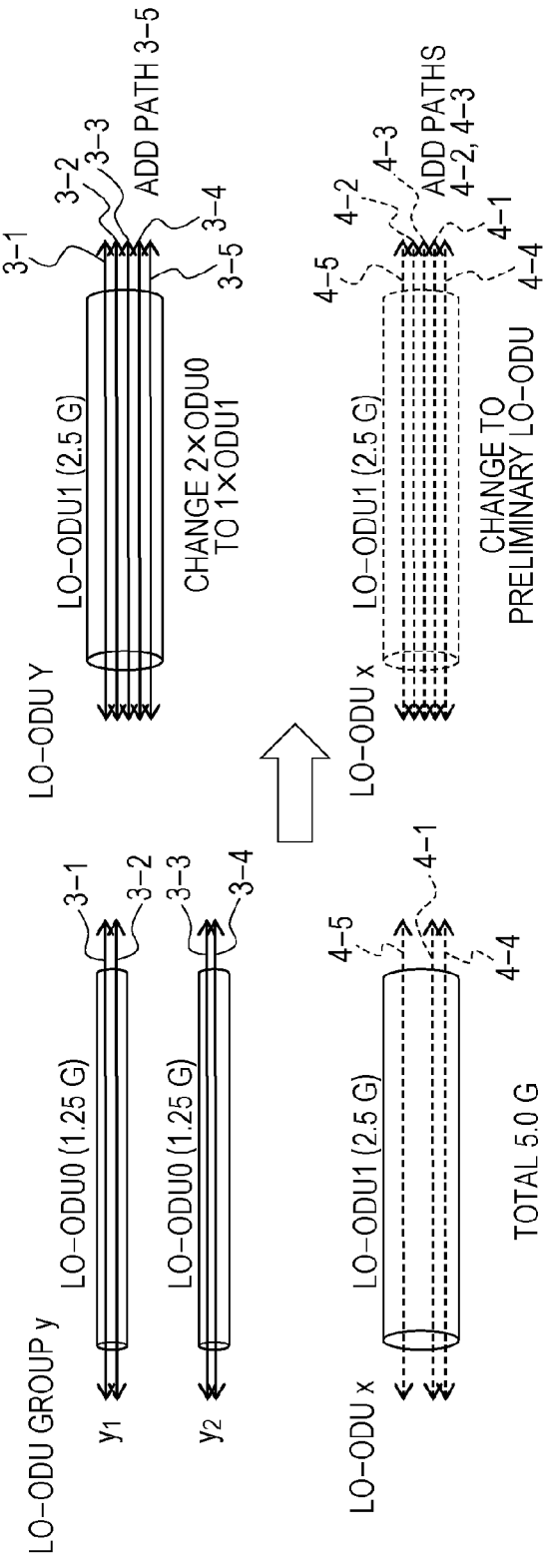

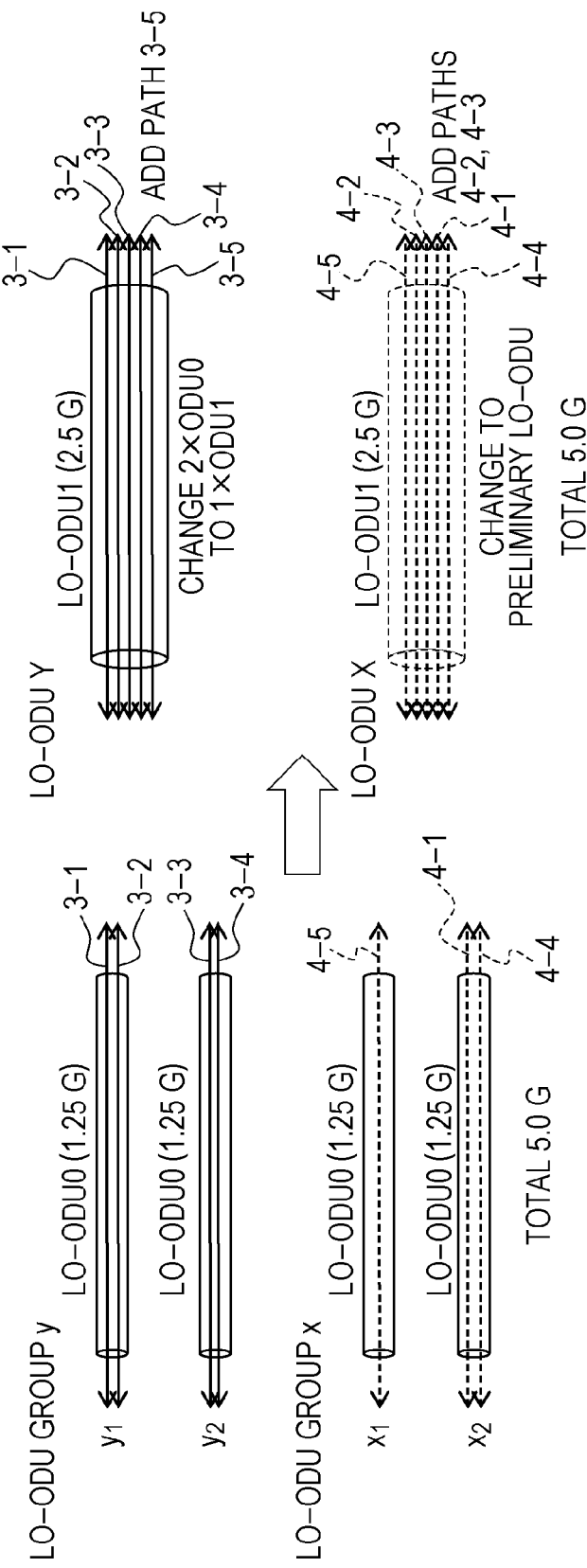

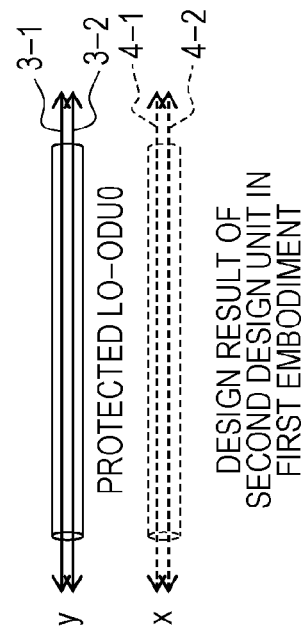
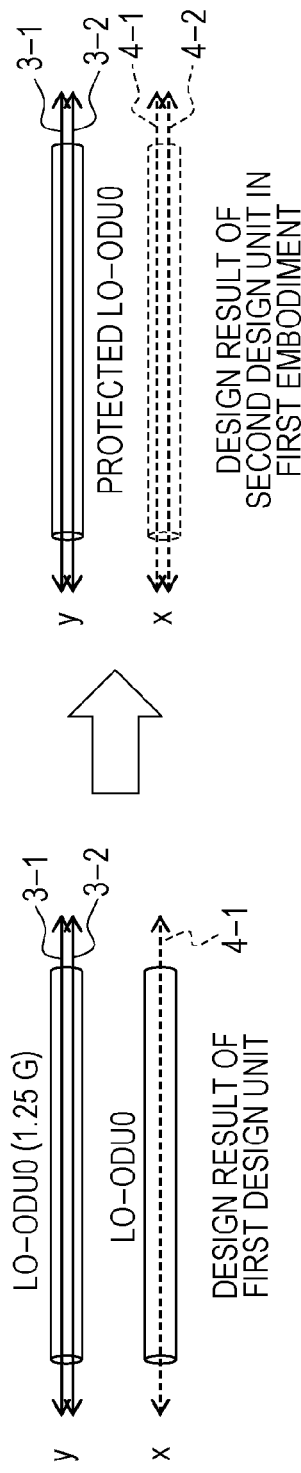

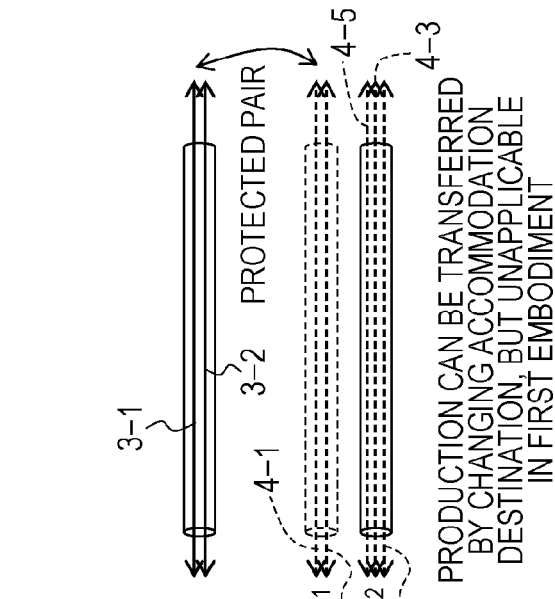
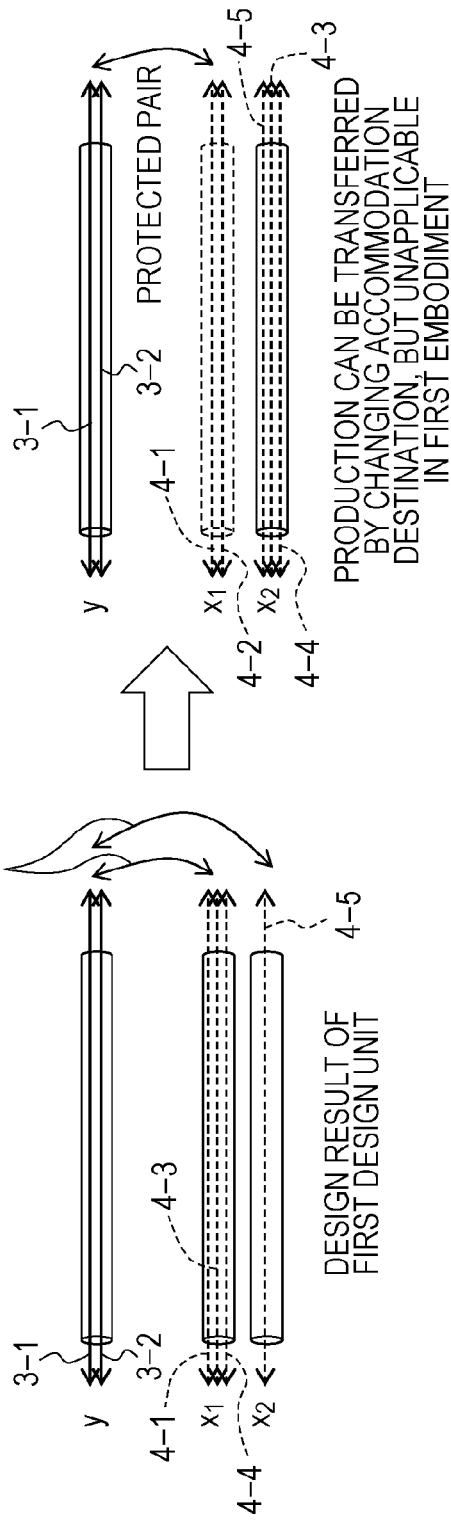

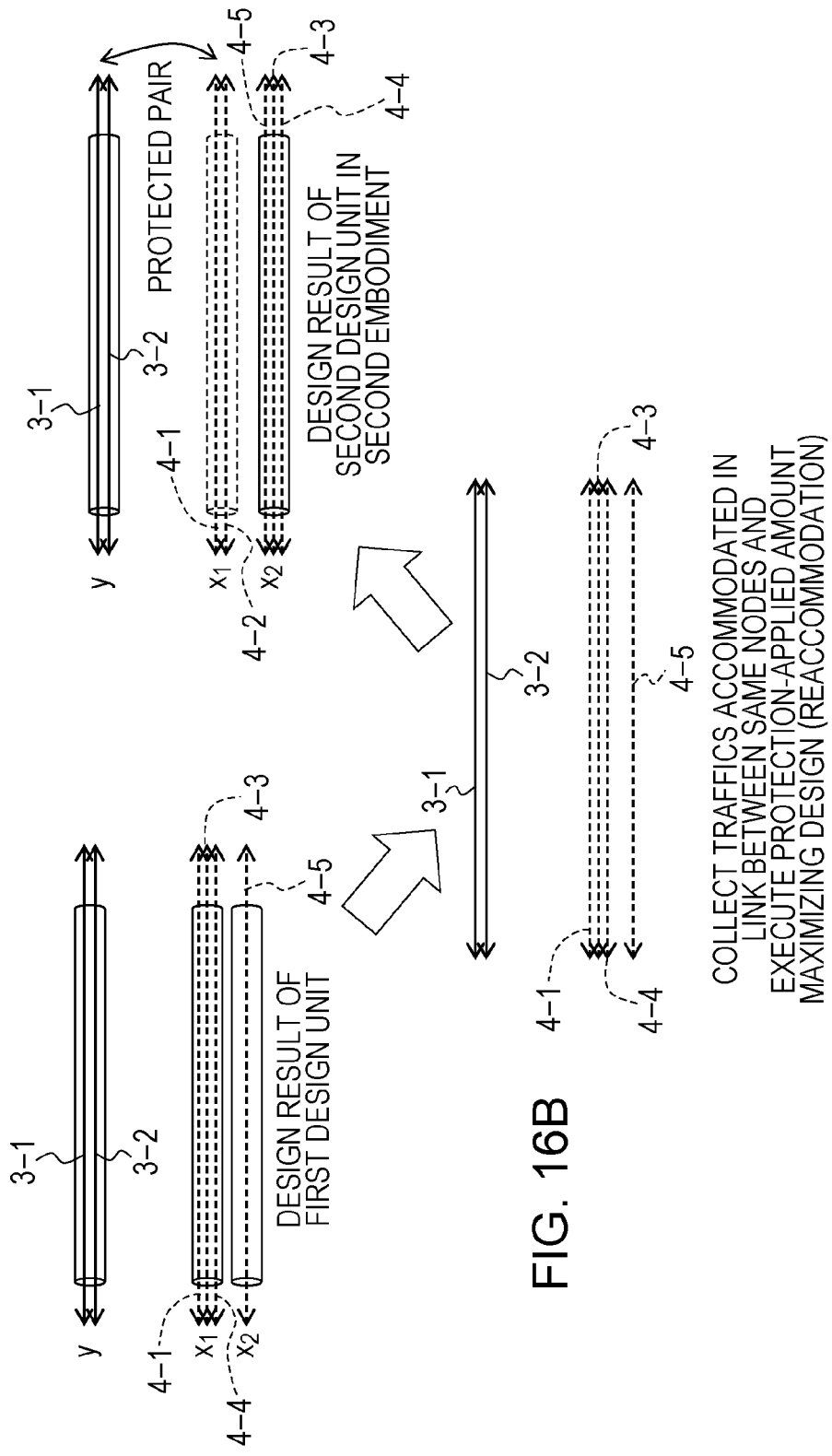

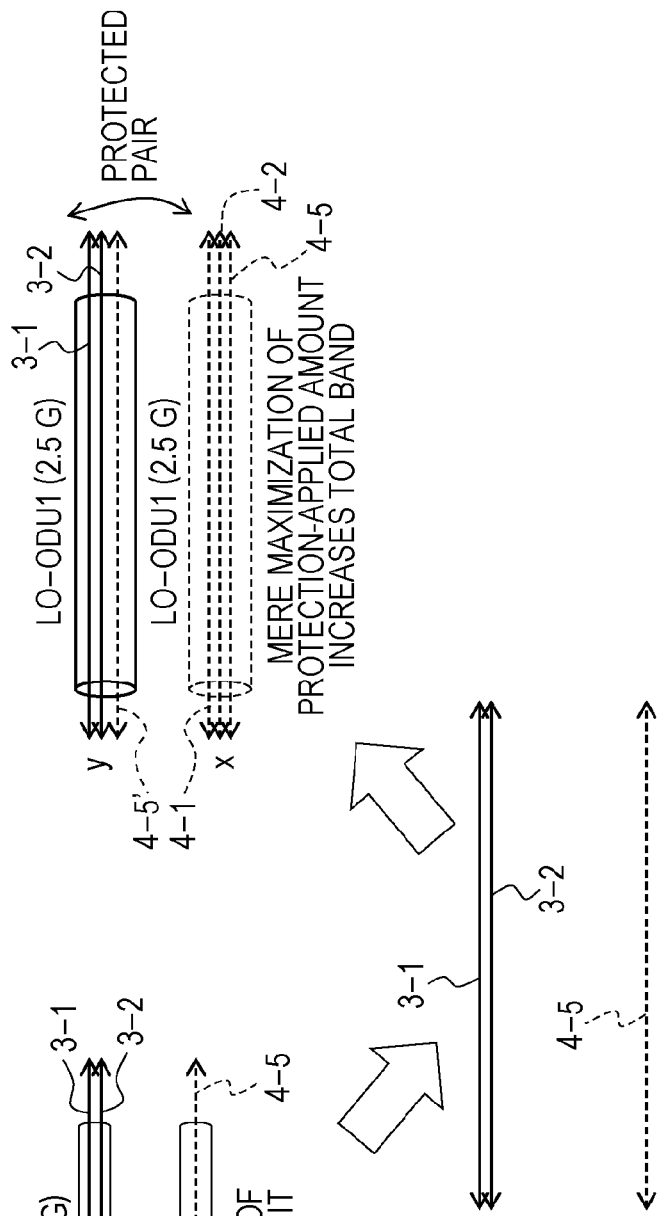

FIG. 22A  INPUT INFORMATION
AVAILABLE LINK TYPE: ODU0, ODU1
(BAND: ODU0 = 1, ODU1 = 2)
PATH: 1, 2
$A_1 = 1, A_2 = 2, \varepsilon = 0$
AT INPUT:
 PATH 1: 1×ODU0
 PATH 2: 2×ODU0
FIG. 22B  CANDIDATE LINK OF PATH 1: 1×ODU0
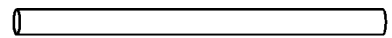
CANDIDATE LINK OF PATH 2: 2×ODU0, 1×ODU1
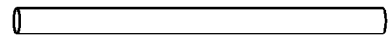
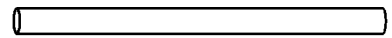
FOR EACH LINK TYPE, GENERATE MAXIMUM NUMBER
OF CANDIDATE LINKS SUCH THAT TOTAL
BAND DOES NOT EXCEED $A_j + \varepsilon$ FIG. 24
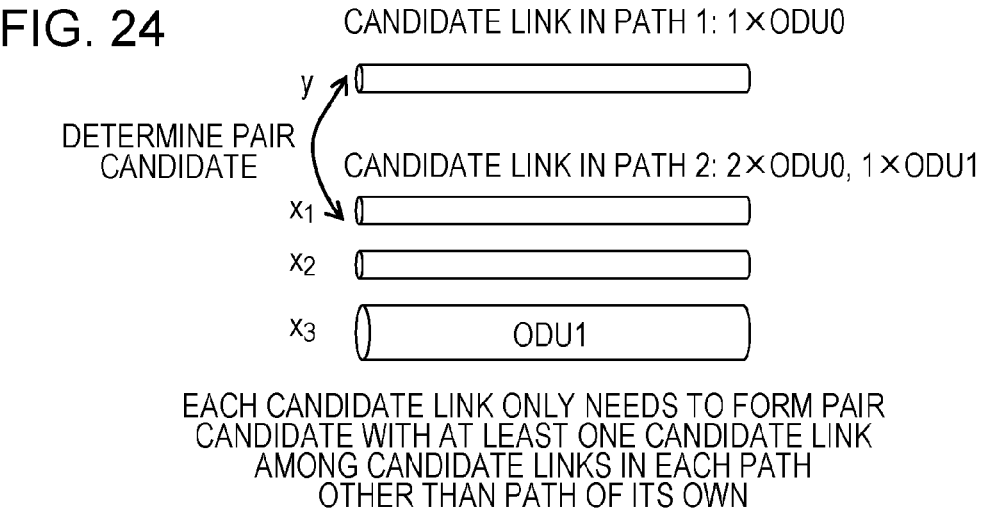
EACH CANDIDATE LINK ONLY NEEDS TO FORM PAIR
CANDIDATE WITH AT LEAST ONE CANDIDATE LINK
AMONG CANDIDATE LINKS IN EACH PATH
OTHER THAN PATH OF ITS OWN
FIG. 25
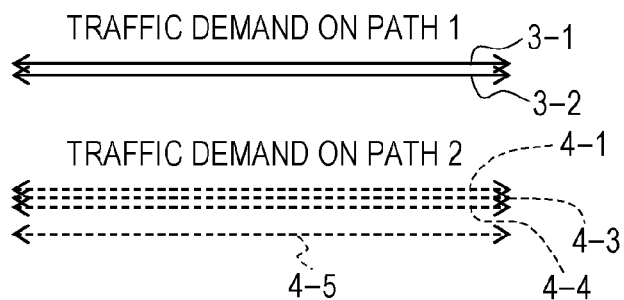
FIG. 26  $A = 3\ (A_1 = 1, A_2 = 2),\ \varepsilon = 0$
TOTAL BAND OF USED LINKS IS 3
(SATISFY CONSTRAINT CONDITION)
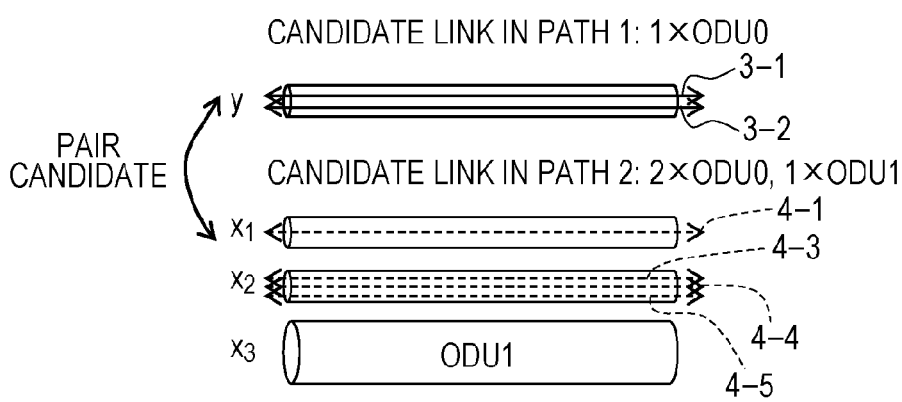

NETWORK DESIGN APPARATUS, NETWORK DESIGN METHOD, AND STORAGE MEDIUM STORING NETWORK DESIGN PROGRAM

CROSS-REFERENCE TO RELATED APPLICATION

This application is based upon and claims the benefit of priority of the prior Japanese Patent Application No. 2014-155864 filed on Jul. 31, 2014, the entire contents of which are incorporated herein by reference.

FIELD

Embodiments discussed herein are related to a network design apparatus, a network design method, and a storage medium storing a network design program.

BACKGROUND

With an increasing demand for communication, high-speed optical transmission methods have been standardized. For example, the International Telecommunication Union Telecommunication Standardization Sector (ITU-T) recommendation G.709 prescribes the technique of the optical transport network (OTN) of about 2.5 to 100 Gbps.

The OTN enables large-capacity optical transmission by multiplexing a plurality of optical signals each accommodating a user signal according to the wavelength division multiplexing (WDM) technique. Examples of the user signal accommodated in the optical signal include a synchronous digital hierarchy (SDH) frame, a synchronous optical network (SONET) frame, and an Ethernet (trademark) frame.

In accommodation design processing targeted for such network, it has been expected to cut costs of the entire network by optimizing an upper order layer to a lower-order layer in an integrated manner. Because of the progress of standardization, in the layer handing packets as well as the lower-order layer such as the OTN, the protection band using shared protection is progressing.

For example, in the OTN, signaling and shared protection that use generalized multi-protocol label switching (GM-PLS) in the internet engineering task force (IETF) Internet Draft draft-ietf-ccamp-gmpls-signaling-g709v3 have been examined. The shared protection enables sharing a protection network resource between working traffics that do not share a fault scenario.

Concerning network design, Japanese Laid-open Patent Publication No. 04-263540 describes that a predetermined number of lines are previously assigned to a protection link, and some of the assigned lines are deleted so as to satisfy the fault repair rate. Japanese Laid-open Patent Publication No. 2003-115872 discloses a method of achieving band sharing of a protection path. Japanese Patent No. 5151387 describes that protection is applied to an upper order layer in a multi-layer network based on the protection type supplied from the lower-order layer.

In the network to which shared protection is applied can share the band with a plurality of protection paths to provide protection with reduced network resource. In the multi-layer environment, it is desirable to apply shared protection to a lowest possible layer. The reason is that the granularity of traffics in the lower-order layer is large, increasing the reduced amount of the network resource (reduced amount of the band) by sharing the protection band. In addition, the reduction of the band in the lower-order layer tends to directly lead to reduction of a physical interface, largely reducing equipment costs.

Therefore, in the multi-layer network, it is desirable to transfer the layer to which shared protection is applied to the lowest possible layer. According to the normal multi-layer design method, optimum design is generally made for each layer, but in some cases, protection is not transferred to the lower-order layer.

SUMMARY

According to an aspect of the invention, a network design apparatus includes: a memory; and a processor coupled to the memory and configured to execute: accommodation design processing of, based on a traffic of a protection-applied or protection-unapplied first link in a first layer, generating a protection-unapplied second link in a second layer lower than the first layer, and generating a working path and a protection path of the first link on a network configured of the second link, and protection application processing of, based on the protection-unapplied second link and the working path and the protection path of the first link that are generated in the accommodation design processing, selecting or generating a protection-applied link in the second layer from the protection-unapplied second link.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 11A and 11B are views for illustrating the network design in First embodiment;

FIGS. 12A and 12B are views for illustrating network design in a first modification example of First embodiment;

FIGS. 13A and 13B are views for illustrating network design in a second modification example of First embodiment;

FIGS. 14A and 14B are views for illustrating a design result in First embodiment;

FIGS. 15A and 15B are views for illustrating design result in Second embodiment;

FIGS. 16A, 16B, and 16C are views for illustrating a design result in Second embodiment;

FIGS. 17A, 17B, and 17C are views for illustrating the design result in Second embodiment;

FIGS. 22A and 22B are views illustrating the link candidate generation processing in FIG. 20;

FIG. 24 is a view illustrating the link pair candidate generation processing in FIG. 20;

FIG. 25 is a view illustrating the reaccommodation design processing in FIG. 20;

FIG. 26 is a view illustrating the reaccommodation design processing in FIG. 20.

DESCRIPTION OF EMBODIMENTS

Embodiments of a network design apparatus, network design method, and a network design program of this application will be described below in detail with reference to figures. However, the below-mentioned embodiments are merely examples, embodiments, and do not exclude various modifications and applications not recited. In other words, the embodiments can be variously modified and implemented so as not to deviate from the subject matter. Only the constituents shown in the figures are not necessarily provided, and any other functions may be included. The embodiments may be combined with each other so as not to cause a contradiction in contents.

[1] Accommodation Design Processing for Multi-Layer Network

Figure 1:
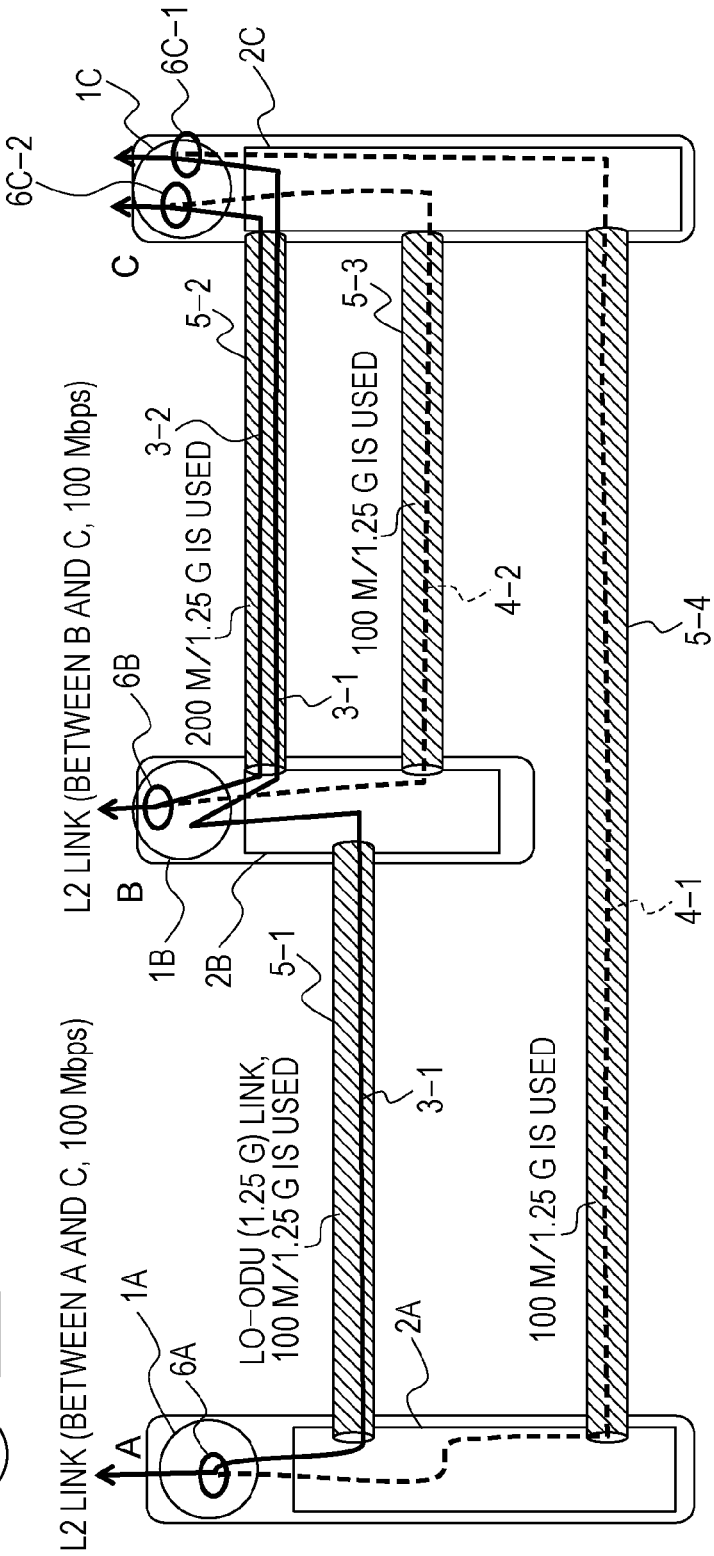
FIG. 1 is a view for illustrating network design for a multi-layer network.
Figure 2:
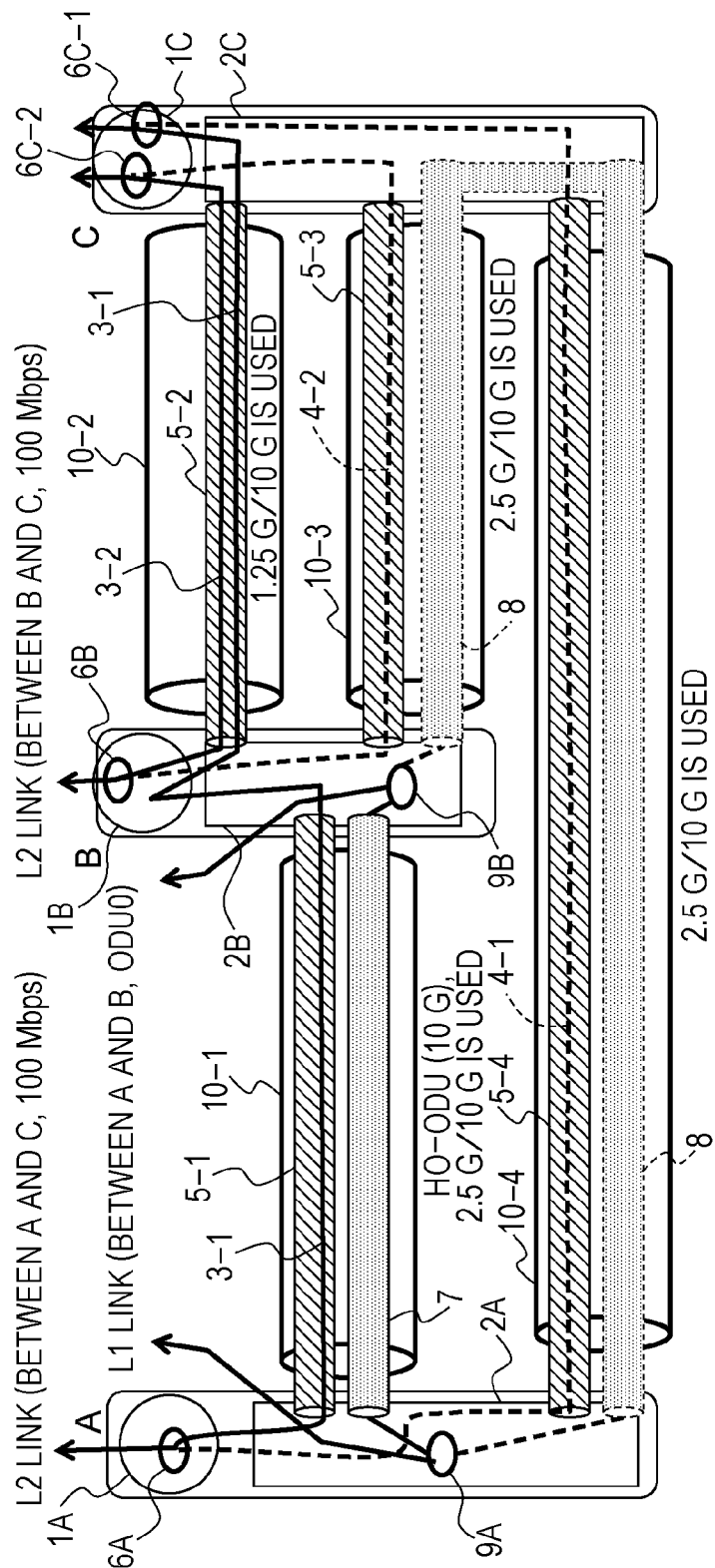
FIG. 2 is a view for illustrating network design for the multi-layer network.
Figure 3:
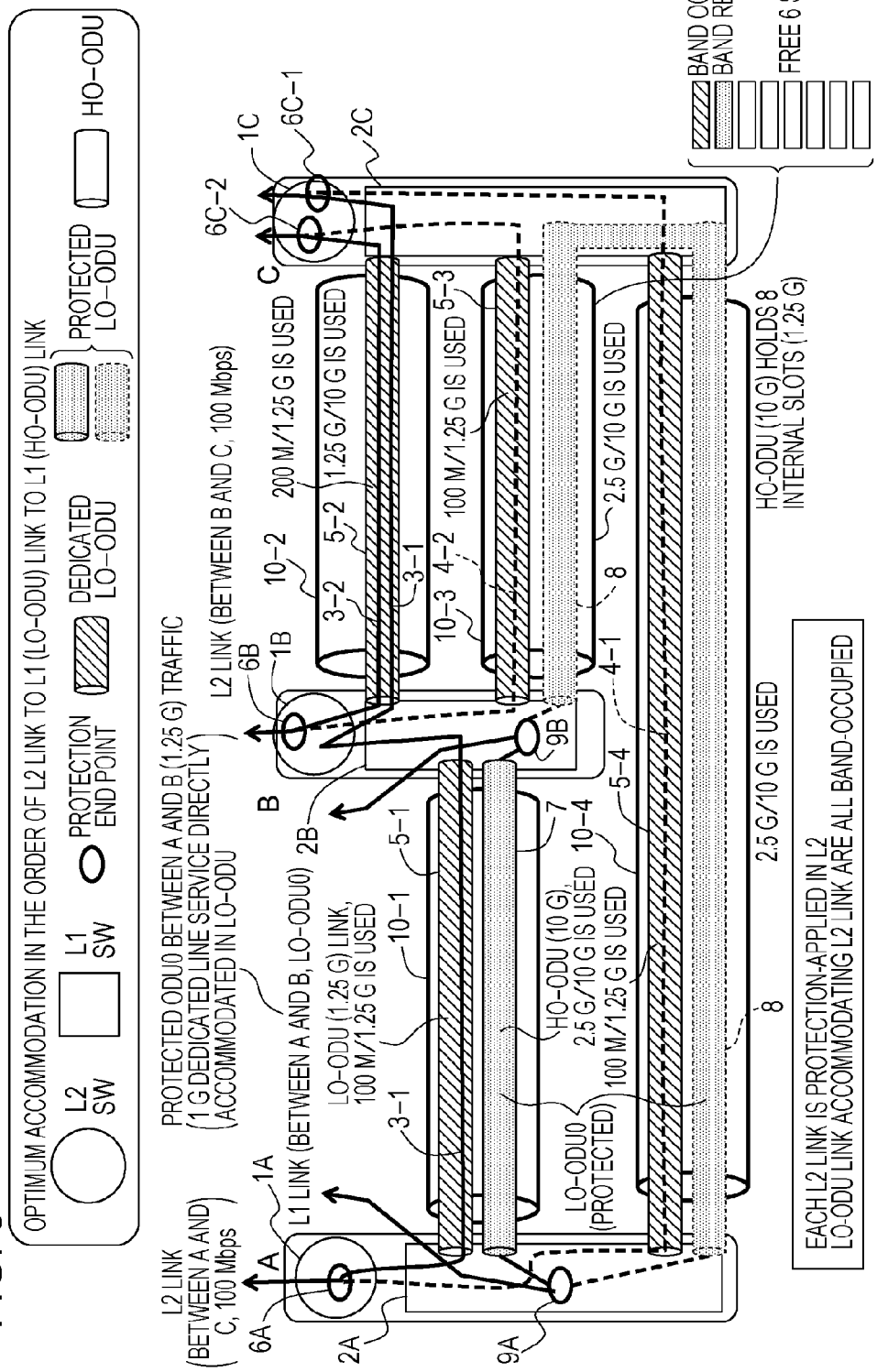
FIG. 3 is a view for illustrating network design for the multi-layer network.

With reference to FIG. 1 through FIG. 3, an example of accommodation design processing of designing a lower-order layer that accommodates traffics of an upper order layer in a multi-layer network will be described below. FIG. 1 through FIG. 3 are views for illustrating design of the multi-layer network.

FIG. 1 through FIG. 3 illustrate general accommodation design processing of three layers including a packet layer (L2) as the multi-layer network, lower-order optical channel data unit (LO-ODU) and the higher order optical channel data unit (HO-ODU) in the OTN. Here, the L2 layer is a top layer (first layer), the LO-ODU is a second layer lower than the L2 layer, and the HO-ODU is a bottom layer (third layer) lower than the LO-ODU. Optimum accommodation design processing is executed in the order of an L2 link in the first layer, an L1 (LO-ODU) link in the second layer, and an L1 (HO-ODU) link in the third layer.

In the example shown in FIG. 1 through FIG. 3, three nodes A, B, and C are provided, and the network accommodation design processing is executed between the nodes A to C. The nodes A to C have L2 switches (L2SW) 1A to 1C in the L2 layer and L1 switches (L1SW) 2A to 2C in the LO-ODU (second layer), respectively.

In such multi-layer network, in the L2 layer (L2 link), 100 Mbps as input traffic is assigned between the nodes A and C, and between the nodes B and C. The input traffic is protected in the L2 layer, and forms a pair of working path (working signal) and a protection path (protection signal). In FIGS. 1 through 3, the working path is represented as a solid line, and the protection path is represented as a dotted line.

Referring to FIG. 1, the accommodation design processing from the L2 layer to the LO-ODU layer will be described below. In the accommodation design processing, based on the traffic given as the L2 link, a protection-unapplied (unprotected) LO-ODU link in the LO-ODU layer lower than the L2 layer, and the working path and the protection path of the L2 link on the network constituted of the LO-ODU link are generated. The protection-unapplied link holds the band-occupying working path in the lower layer than itself, and does not hold the band-reserving protection path.

Specifically, in FIG. 1, the protection-applied (protected) L2 link between the nodes A and C is a pair of a working path 3-1 and a protection path 4-1, and the protection-applied L2 link between the nodes B and C is a pair of a working path 3-2 and a protection path 4-2. Each of the paths (signals) 3-1, 3-2, 4-1, and 4-2 is accommodated in one or more links (LO-ODU links) among 5-1 to 5-4 in the lower-order layer.

That is, the working path 3-1 is accommodated in the 1.25 Gbps LO-ODU link 5-1 between the nodes A and B, and in the 1.25 Gbps LO-ODU link 5-2 between the nodes B and C. The protection path 4-1 that forms a pair with the working path 3-1 is accommodated in the 1.25 Gbps LO-ODU link 5-4 between the nodes A and C. A side end of the working path 3-1 at the node A and a side end of the protection path 4-1 at the node A are connected to a protection switch point (end point) 6A of the L2 switch 1A at the node A. A side end of working path 3-1 at the node C and a side end of the protection path 4-1 at the node C are connected to a protection switch point 6C-1 of the L2 switch 1C at the node C. The working path 3-1 is accommodated in the link 5-2 at the node B from the link 5-1 via the L1 switch 2B and the L2 switch 1B.

The working path 3-2 is accommodated in the 1.25 Gbps LO-ODU link 5-2 between the nodes B and C. The protection path 4-2 that forms a pair with the working path 3-2 is accommodated in the 1.25 Gbps LO-ODU link 5-3 between the nodes B and C. A side end of the working path 3-2 at the node B and a side end of the protection path 4-2 at the node B are connected to a protection switch point 6B of the L2 switch 1B at the node B. A side end of the working path 3-2 at the node C and a side end of the protection path 4-2 at the node C are connected to a protection switch point 6C-2 of the L2 switch 1C at the node C.

By executing the accommodation design processing in this manner, in the LO-ODU link 5-1, 100 Mbps (working path 3-1; band occupied) in the 1.25 Gbps band is used. In the LO-ODU link 5-4, 100 Mbps (protection path 4-1; band reserved) in the 1.25 Gbps band is used. In the LO-ODU link 5-2, 200 Mbps (working paths 3-1, 3-2; band occupied) in the 1.25 Gbps band is used. In the LO-ODU link 5-3, 100 Mbps (protection path 4-2; band reserved) in the 1.25 Gbps band is used.

In the example illustrated in FIG. 1, by executing the accommodation design processing based on the input traffic 100 Mbps assigned to between the nodes A and C and between the nodes B and C, the four protection-unapplied LO-ODU links 5-1 to 5-4 (4× unprotected ODU0) are acquired as outputs. The 1.25 Gbps ODU link may be referred to as "ODU0", the 2.5 Gbps ODU link may be referred to as "ODU1", and the 10 Gbps ODU link may be referred to as "ODU2".

Next, referring to FIG. 2 and FIG. 3, the accommodation design processing from the LO-ODU to the HO-ODU will be described. As illustrated in FIG. 2 and FIG. 3, upper order layer design result (4× unprotected ODU0) acquired as illustrated in FIG. 1, and a LO-ODU layer demand are given as the LO-ODU layer input traffic. Here, a protection-applied ODU0 signal (1× protected ODU0) as the LO-ODU layer demand is given between the nodes A and B. In the accommodation design processing, a protection-unapplied HO-ODU link in the HO-ODU layer lower than the LO-ODU layer, the working path and the protection path of the LO-ODU link on the network accommodated in one or more HO-ODU links are generated based on the LO-ODU layer input traffic.

Specifically, in FIG. 2 and FIG. 3, the protection-applied LO-ODU link (L1 link) between the nodes A and B is a pair of a working path 7 (ODU0) and a protection path 8 (ODU0). The LO-ODU links 5-1 to 5-4, 7, and 8 are accommodated in HO-ODU links 10-1 to 10-4 (ODU2) in the layer lower than the LO-ODU.

That is, the working LO-ODU link 7 is an ODU0 link between the nodes A and B, and the protection LO-ODU link 8 is an ODU0 link from the node A to the node B through the node C. A side end of the LO-ODU link 7 at the node A and a side end of the LO-ODU link 8 at the node A are connected to a protection switch point 9A of the L1 switch 2A at the node A. A side end of the LO-ODU link 7 at the node B and a side end of the LO-ODU link 8 at the node B are connected to a protection switch point 9B of the L1 switch 2B at the node B.

The two LO-ODU links 5-1 and 7 between the nodes A and B are accommodated in the protection-unapplied HO-ODU link 10-1 (ODU2). The LO-ODU link 5-2 between the nodes B and C is accommodated in the protection-unapplied HO-ODU link 10-2 (ODU2). The LO-ODU links 5-3 and 8 between the nodes B and C are accommodated in the protection-unapplied HO-ODU link 10-3 (ODU2). The LO-ODU links 5-4 and 8 between the nodes A and C are accommodated in the protection-unapplied HO-ODU link 10-4 (ODU2).

By executing the accommodation design processing in this manner, in the HO-ODU link 10-1, 2.5 Gbps (LO-ODU links 5-1 and 7; band occupied) in the 10 Gbps band is used. In the HO-ODU link 10-2, 1.25 Gbps (LO-ODU link 5-2; band occupied) in the 10 Gbps band is used. In the HO-ODU link 10-3, 2.5 Gbps (band-occupying LO-ODU link 5-3 and band-reserving LO-ODU link 8) in the 10 Gbps band is used. In the HO-ODU link 10-4, 2.5 Gbps (band-occupying LO-ODU link 5-4 and band-reserving LO-ODU link 8) in the 10 Gbps band is used.

Here, for example, the HO-ODU link (ODU2) has a 10 Gbps band, and holds 8 internal time slot called tributary slot (at the rate of 1.25 Gbps). In this case, for example, as illustrated in FIG. 3, in the HO-ODU link 10-3, one slot is band-occupied with the LO-ODU link 5-3, another slot is band-reserved with the LO-ODU link 8, and remaining 6 slots are free.

As described above, in the example illustrated in FIG. 2, by executing the accommodation design processing based on the upper order layer design result acquired as illustrated in FIG. 1 and the LO-ODU layer demand, four protection-unapplied HO-ODU links 10-1 to 10-4 (4× unprotected ODU2) are acquired as outputs.

In the example illustrated in FIG. 2 and FIG. 3, the LO-ODU links 5-1 to 5-4 accommodating packet traffic (paths 3-1, 3-2) are protection-unapplied in the LO-ODU layer, and occupy the time slots within HO-ODU links 10-1 to 10-4 in the layer lower than the LO-ODU layer. In the example illustrated in FIG. 2 and FIG. 3, all packet traffics are protection-applied at the packet (L2) layer, and do not transfer protection to the layer lower than the packet layer.

In consideration of such circumstances, below-mentioned network design technique in First embodiment and Second embodiment enables transfer the protection at the upper layer to the lower layer in the multi-layer network as much as possible.

[2] Hardware Configuration of this Embodiments

Figure 4:
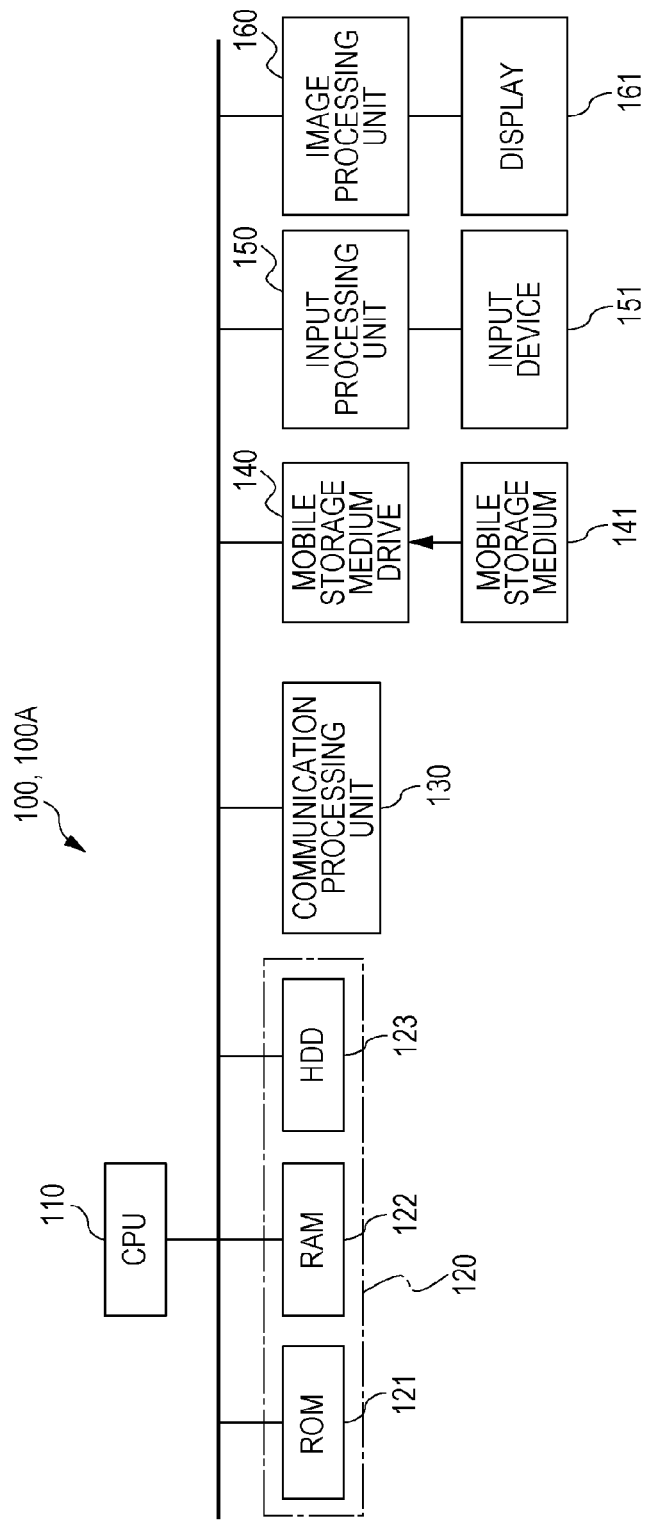
FIG. 4 is a block diagram illustrating an example of hardware configuration of the network design apparatus in this embodiment.

First, referring to FIG. 4, an example of hardware configuration of the network design apparatus in this embodiment will be described. FIG. 4 is a block diagram illustrating an example of the hardware configuration. A reference numeral 100 denotes a network design apparatus in First embodiment, and a reference numeral 100A denotes a network design apparatus in Second embodiment.

The network design apparatus 100 or 100A in the embodiments designs the lower-order layer that accommodates traffics in the upper order layer in the multi-layer network. The network design apparatus 100 or 100A is configured of an information processor (computer) having the hardware configuration as illustrated in FIG. 4, such as a general personal computer (PC). That is, the network design apparatus 100 or 100A has a CPU (Central Processing Unit) 110, a storage unit 120, a communication processing unit 130, a movable storage medium drive 140, an input processing unit 150, and an image processing unit 160.

The CPU 110 is an example of a processing unit (processor, computer) for performing various types of control and operations. The CPU 110 is connected to the storage unit 120, the communication processing unit 130, the movable storage medium drive 140, the input processing unit 150, and the image processing unit 160, and executes a program stored in the storage unit 120 or a movable storage medium 141 to achieve various functions. Especially, the CPU 110 executes the network design program to achieve a function of a below-mentioned first design unit 111 and a function of a below-mentioned second design unit 112 or 112A.

The storage unit 120 includes a read only memory (ROM) 121, a random access memory (RAM) 122, and a hard disk device (HDD) 123. The ROM 121 and the HDD 123 store various data and programs. The RAM 122 expands data and programs read from the ROM 121 and the HDD 123 at execution of the program with the CPU 110, and stores them. The storage unit 120 may include a semiconductor drive such as a solid state drive (SSD) and a nonvolatile memory such as a flash memory or a ROM. The RAM 122 and the HDD 123 in the storage unit 120 can store topology information, traffic information, layer information, and a lower-order layer design results, which are described later with reference to FIG. 5 and FIG. 18.

The communication processing unit 130 is a communication interface that controls wired or wireless connection and communication with the network and other information processors. Examples of the communication processing unit 130 is an adaptor conforming to LAN (Local Area Network), Fiber Channel (FC), InfiniBand, and the like. For example, the CPU 110 may store a program acquired from the network via the communication processing unit 130 in the storage unit 120.

The movable storage medium drive 140 reads data and programs recorded in the computer-readable movable storage medium 141. The movable storage medium 141 may store a network design program. Examples of the movable storage medium 141 include optical discs such as flexible discs, compact disc (CD), digital versatile disc (DVD), and blue-ray discs, and flash memories such a universal serial bus (USB) memories and SD cards. For example, the CD is CD-ROM, CD-recordable (CD-R), or CD-rewritable (CD-RW). For example, the DVD is DVD-ROMs, DVD-RAM, DVD-R, DVD-RW, DVD+R, and DVD+RW.

The input processing unit 150 is connected to an input device 151 such as a touch panel, a mouse, or a keyboard, and functions as an interface between the input device 151 and the CPU 110. The user operates the input device 151 to input various instructions and data into the network design apparatus 100, 100A.

The image processing unit 160 is connected to a display 161 such as a liquid crystal display (LCD), cathode ray tube (CRT), or the like, controls the display state of the display 161, and displays various notifications and design result on the display 161. The user refers to the display 161 to find the state of the network design.

The CPU 110, the storage unit 120, the communication processing unit 130, the drive 140, the input processing unit 150, and the image processing unit 160 are communicably interconnected via a bus. The above-mentioned hardware configuration of the network design apparatus 100 or 100A is an example. Accordingly, increase/decrease (for example, addition and deletion of any block), division, integration in any combination, addition or deletion of the bus in the hardware in the network design apparatus 100, 100A may be performed as appropriate.

[3] First Embodiment

[3-1] Functional Configuration of First Embodiment

Figure 5:
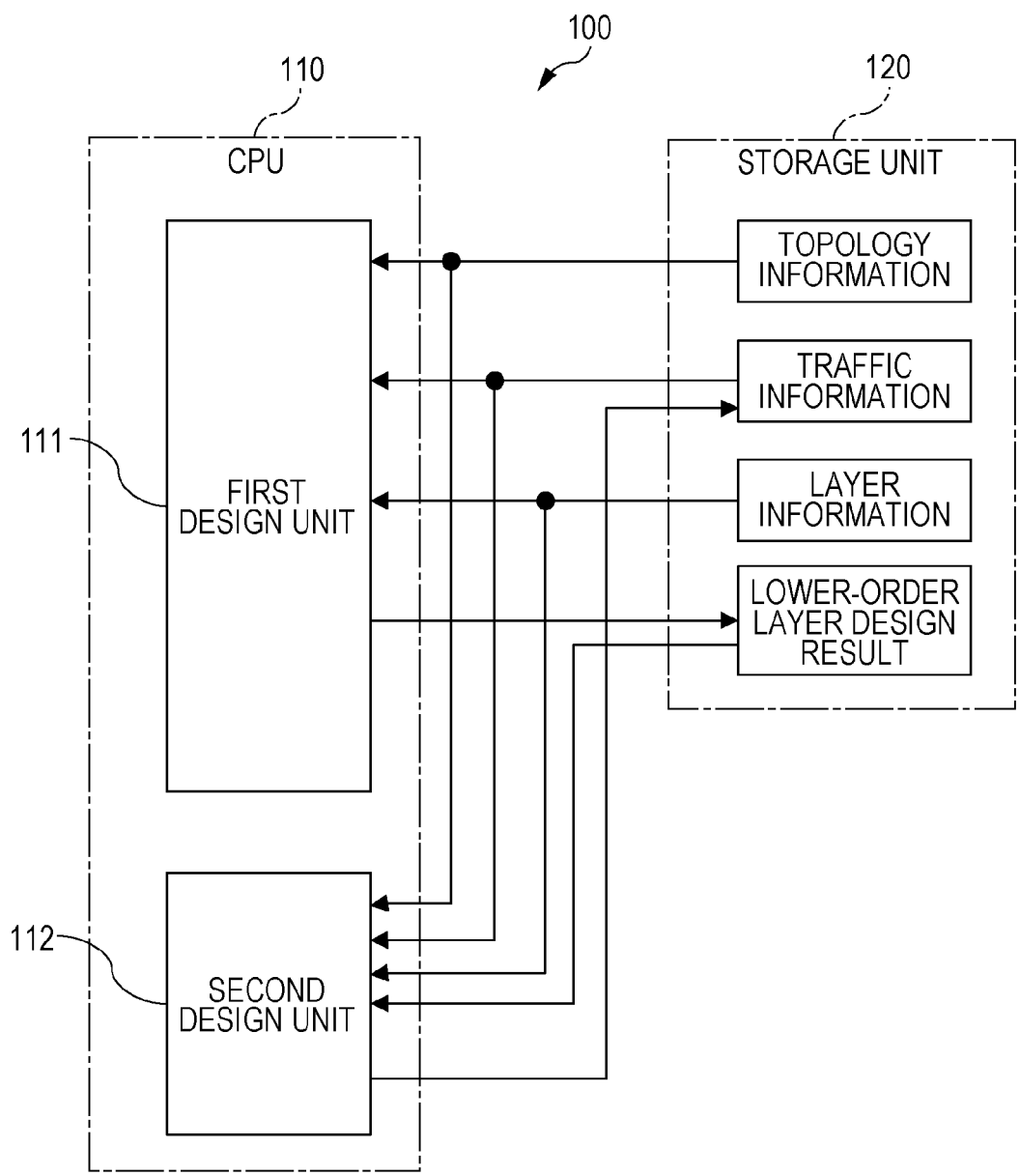
FIG. 5 is a block diagram illustrating an example of functional configuration of the network design apparatus in First embodiment.

Next, referring to FIG. 5, an example of functional configuration of the network design apparatus 100 in First embodiment will be described. FIG. 5 is a block diagram illustrating an example of the functional configuration.

The storage unit 120 (RAM 122, HDD 123) stores the above-mentioned network design program as well as topology information, traffic information, layer information, and a lower-order layer design result.

The topology information includes information on multiple nodes in the multi-layer network to be designed, and connection between the nodes. For example, the topology information of the network illustrated in FIG. 1 through FIG. 3 and FIG. 8 through FIG. 10 includes on information on the three nodes A to C, connection between the nodes A and B, between the nodes B and C, and between the nodes A and C via an optical fiber.

The traffic information includes information on the input traffic in each layer in the multi-layer network to be designed. For example, the traffic information of the network illustrated in FIG. 1 through FIG. 3 and FIG. 7 through FIG. 10 includes information on packet layer input traffic and LO-ODU layer input traffic. That is, it is defined that protection-applied 100 Mbps as the packet layer input traffic is given between the nodes A and C and between the nodes B and C, respectively. Further, it is defined that the upper order layer design result (below-mentioned design result of the second design unit 112) is given as the input traffic at the underlying layer, and the traffic demands directly given to the underlying layer (such as the protection-applied ODU0 link illustrated in FIG. 1 through FIG. 3) is given.

The layer information includes information on multiple layers constituting the multi-layer network to be designed. For example, the layer information of the network illustrated in FIG. 1 through FIG. 3 and FIG. 7 through FIG. 10 includes information on three layers, that is, the packet layer, the LO-ODU, and the HO-ODU, that constitute the multi-layer network to be designed. As described above, the packet layer is a top layer (first layer), the LO-ODU is a second layer lower than the packet layer, and the HO-ODU is a bottom layer (third layer) lower than the LO-ODU.

The lower-order layer design result is a result of the accommodation design processing with the first design unit 111, and is used at execution of protection application processing with the second design unit 112.

The CPU 110 executes the network design program as described above to perform the functions of the first design unit 111 and the second design unit 112.

Figure 6:
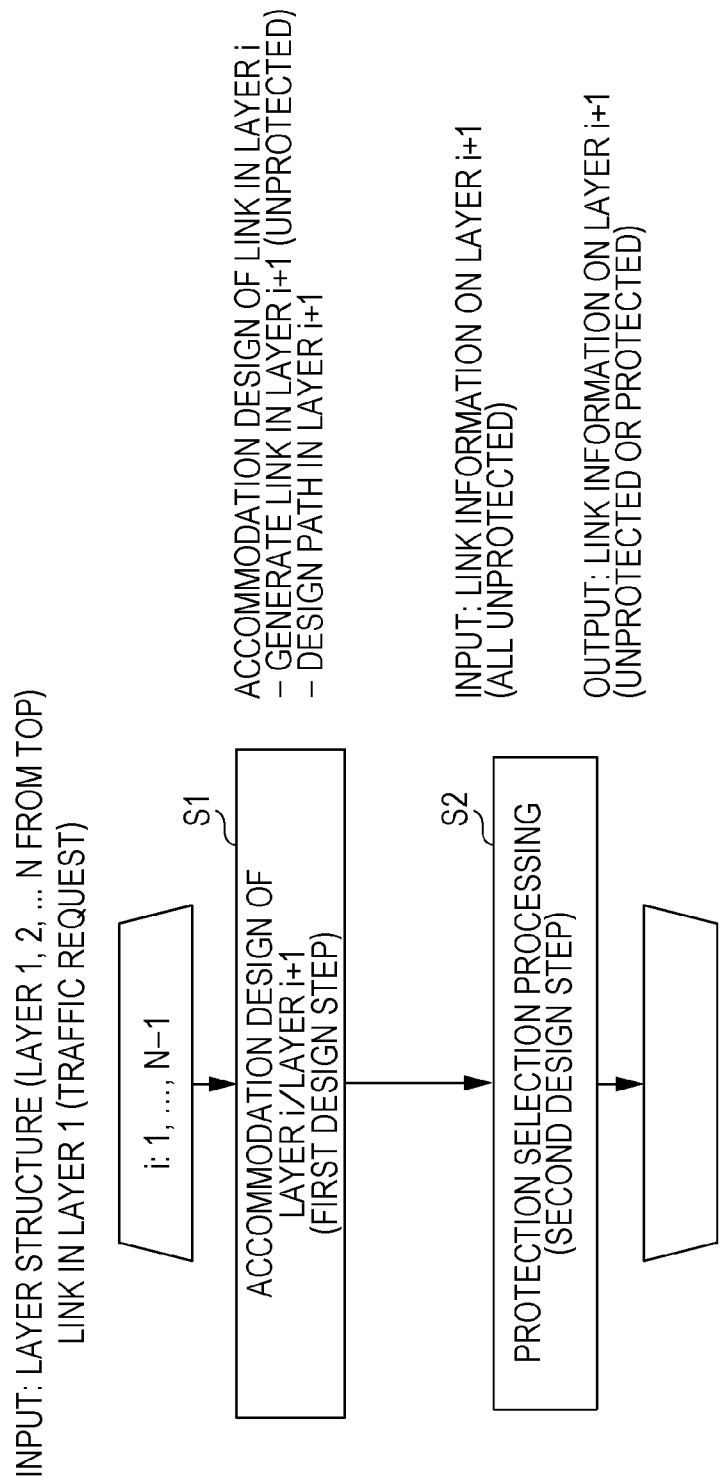
FIG. 6 is a flow chart illustrating a procedure of network design in First embodiment.

The first design unit 111 executes following accommodation design processing based on the topology information, the traffic information, and the layer information in the storage unit 120 (see Operation S1 in FIG. 6). The accommodation design processing is executed based on the traffic of a protection-applied (protected) or protection-unapplied (unprotected) first link in a first layer (layer i; i is an integer of 1 or more). In the accommodation design processing, a protection-unapplied (unprotected) second link in a second layer (layer i+1) lower than the first layer is generated, and the working path and the protection path of the first link on the network configured of the second link are generated. The accommodation design processing result acquired using the first design unit 111 is stored as a lower-order layer design result in the storage unit 120. As specific example of the accommodation design processing of the first design unit 111 will be described later with reference to FIG. 7 and FIG. 9.

In this embodiment, the first layer is the packet layer (layer 1) or the LO-ODU (layer 2), and the second layer is the LO-ODU (layer 2) or the HO-ODU (layer 3). The first link is a link in the packet layer (layer 1) or the LO-ODU (layer 2), and the second link is a link in the LO-ODU (layer 2) or the HO-ODU (layer 3). The unprotected second link generated with the first design unit 111 is, for example, LO-ODU links 5-1 to 5-4 described later with reference to FIG. 7. The working path and the protection path of the first link generated with the first design unit 111 are, for example, working paths 3-1, 3-2 and protection paths 4-1, 4-2 described later with reference to FIG. 7.

The second design unit 112 executes following protection application processing based on the topology information, the traffic information, the layer information, and the lower-order layer design result in the storage unit 120 (see Operation S2 in FIG. 6). In the protection application processing, based on the unprotected second link, and working path and the protection path of the first link, which are generated with the first design unit 111, the protected link (protection-applied link) in the second layer is selected from the unprotected second link.

The second design unit 112 in First embodiment sequentially following processing P1 to P3.

Processing P1: The second design unit 112 extracts the second link accommodating the paths that are all protection paths of the first link from a plurality of unprotected second links generated by the first design unit 111, as a third link x.

The second links are, for example, are LO-ODU links 5-1 to 5-4 described later with reference FIG. 7 and FIG. 8. The third link x is, for example, the LO-ODU link 5-3 described later with reference FIG. 7 and FIG. 8.

Processing P2: on the third link x extracted in the processing P1, the second design unit 112 searches for the second link satisfying all of below-mentioned predetermined protection application condition: C1 to C4 among the plurality of unprotected second links generated by the first design unit 111, as a fourth link y. The fourth link y is, for example, the LO-ODU link 5-2 described later with reference FIG. 7 and FIG. 8.

Processing P3: The second design unit 112 selects the third link x and the fourth link y as a protection link and a working link for the protection-applied link (protected link) in the second layer (LO-ODU), respectively. The working fourth link y is, for example, the LO-ODU link 5-2 (band occupied) described later with reference to FIG. 8 through FIG. 10. The protection third link x is, for example, the band-reserving LO-ODU link 5-5 changed from the band-occupying LO-ODU link 5-3 described later with reference to FIG. 8 through FIG. 10. As a result, a pair of the LO-ODU link 5-2 and 5-5 (5-3) form the protection-applied link, and in the multi-layer network, the protection-applied link is transferred to the second layer (LO-ODU) that is a lower-order layer.

Satisfying the predetermined protection application condition used in the processing P2 in First embodiment means that satisfying all of the following conditions C1 to C4.

Condition C1: An initial node and a terminal node of the second link are identical to an initial node and a terminal node of the third link x.

Condition C2: The second link includes a part or whole of the working path corresponding to the protection path of the first link accommodated in the third link x.

Condition C3: A type of the second link is identical to a type of the third link x. For example, when the type of the second link is the ODU0, the type of the third link x is also the ODU0. Similarly, when the type of the second link is the ODU2, the type of the third link x is also the ODU2. In other words, one second link has the same band as one third link x.

Condition C4: The second link and the third link x each have a band capable of accommodating a link group z in the sum-set of the first link accommodated in the second link and the first link accommodated in the third link x.

When a plurality of fourth links y searched in the above-mentioned processing P2 are present, the second design unit 112 execute following processing P4.

Processing P4: the second design unit 112 selects a fourth link having the largest total band or the largest number of links of a product-set of the first link accommodated in the third link x and the first link accommodated in each fourth link ($y_1$, $y_2$) from a plurality of fourth links ($y_1$, $y_2$) as the working protected link in the second layer. A specific example of the processing P4 will be described with reference to FIG. 11.

The first design unit 111 executes the accommodation design processing of the lower-order layer by using the second layer (layer i+1) including the protection-applied link acquired by the second design unit 112 as the first layer (layer i). A specific example of the accommodation design processing of the lower-order layer will be described later with reference to FIG. 9 and FIG. 10.

When executing the accommodation design processing of the lower-order layer, the first design unit 111 applies shared protection to the protection-applied link selected by the second design unit 112. A specific example of application of shared protection will be described with reference to FIG. 9 and FIG. 10.

[3-2] Network Design Operation in First Embodiment

Next, referring to FIG. 6 through FIG. 11, the network design operation of the network design apparatus 100 in First embodiment will be described below. FIG. 6 is a flow chart illustrating the procedure of network design in First embodiment (Operation S1, S2). FIG. 7 through FIG. 11 are views for illustrating the network design in First embodiment.

As illustrated in FIG. 6, the multi-layer network designed by the network design apparatus 100 in First embodiment has layer 1, 2, . . . , N from the top (N is an integer of 3 or more). The network design apparatus 100 receives such layer configuration and information on the link in the layer 1 (traffic request, input traffic) as input information. The network design apparatus 100 repeatedly executes following processing in Operation S1 and Operation S2 from the upper order layer toward the lower-order layer.

First, the first design unit 111 executes the accommodation design processing of the link (first link) of the layer i that is the upper order layer (first layer; i=1, 2, . . . , N−1) (Operation S1; first design operation). That is, the unprotected link (second link) of the lower-order layer i+1 (second layer), which accommodates the link of the layer i is generated, and path design in the layer i+1 is made. A specific example of the accommodation design processing of the first design unit 111 will be described later with reference to FIG. 7 and FIG. 9.

Then, the second design unit 112 executes protection selection processing that is the above-mentioned protection application processing based on information on the unprotected link in the layer i+1 acquired in Operation S1 (Operation S2; second design operation). That is, the processing P1 to P4 is executed to select the protected link (third link and fourth link) from the unprotected link (second link) in the layer i+1, and output information on the unprotected link or the protected link in the layer i+1.

The information on the unprotected link or the protected link in the layer i+1, which is acquired in Operation S2, i+1 being replaced with i, is inputted to the first design unit 111, and the accommodation design processing of the link in the lower-order layer is executed (Operation S1).

In the multi-layer network described later with reference to FIG. 7 through FIG. 11, N is 3, and first, in Operation S1, the accommodation design processing from the layer 1 (packet layer) to the layer 2 (LO-ODU layer) is executed. After that, in Operation S2, protected link selection processing in the layer 2 is executed. Then, in Operation S1, based on link information in the layer 2, the accommodation design processing from the layer 2 (LO-ODU layer) to the layer 3 (HO-ODU layer) is executed, and shared protection is applied. In the example illustrated in FIG. 7 through FIG. 11, since shared protection in the layer 3 (HO-ODU layer) is not assumed, when the second processing of Operation S1 is completed, network design is finished.

Next, referring to FIG. 7 through FIG. 11, network design in First embodiment will be specifically described. It is assumed that the multi-layer network to be designed is configured of three layers including the packet (L2) layer, the LO-ODU layer, and the HO-ODU layer. Also in the example illustrated in FIG. 7 through FIG. 10, three nodes A, B, and C are provided, and network design between the nodes A to C is devised. The nodes A to C have L2 switches (L2SW) 1A to 1C in the L2 layer and L1 switches (L1SW) 2A to 2C in the LO-ODU, respectively.

First, the accommodation design processing (Operation 1 in FIG. 6) from the L2 (packet) layer to the LO-ODU layer, which is executed using the first design unit 111, will be described with reference to FIG. 7. Also in the example illustrated in FIG. 7, the same accommodation design processing as that in the example illustrated in FIG. 1 is executed by the first design unit 111. That is, in the L2 layer (L2 link), 100 Mbps as input traffic is given between the nodes A and C and between the nodes B and C. The input traffic is protected in the L2 layer and forms a pair of a working path (working signal) and a protection path (protection signal). In FIG. 7 through FIG. 11, the working path is represented as a solid line, and the protection path is represented as a dotted line.

The first design unit 111 (Operation S1 in FIG. 6) generates an unprotected LO-ODU link in the LO-ODU layer lower than the L2 layer, and the working path and the protection path of L2 link upper than the LO-ODU link, based on the traffic of the L2 link. The unprotected link includes only the band-occupying working path and does not include the protection path in the lower-order layer.

Figure 7:
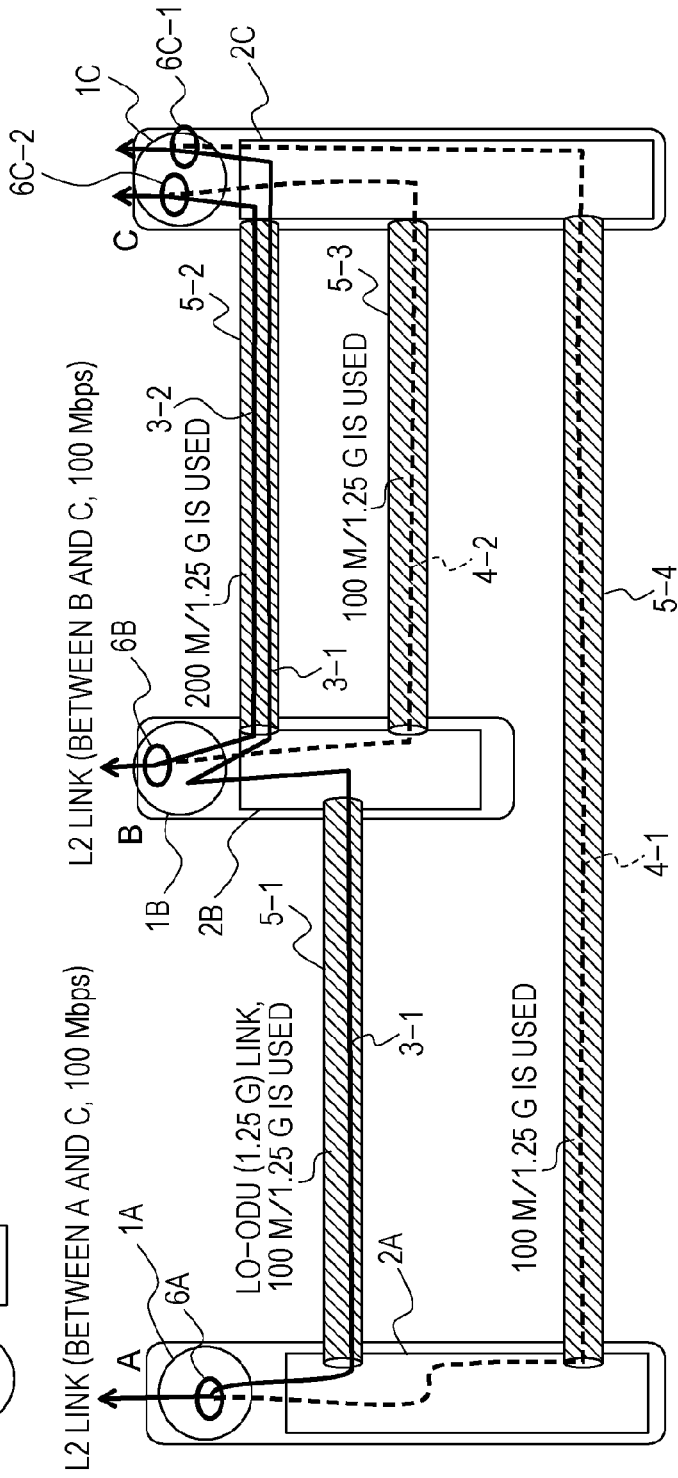
FIG. 7 is a view for illustrating the network design in First embodiment.

Specifically, also in FIG. 7, the protected L2 link between the nodes A and C is the pair of the working path 3-1 and the protection path 4-1, and the protection-applied L2 link between the nodes B and C is the pair of the working path 3-2 and the protection path 4-2. The paths (signals) 3-1, 3-2, 4-1, and 4-2 are accommodated in one or more LO-ODU links 5-1 to 5-4.

That is, the working path 3-1 is accommodated in the 1.25 Gbps LO-ODU link 5-1 between the nodes A and B, and in the 1.25 Gbps LO-ODU link 5-2 between the nodes B and C. The protection path 4-1 that forms a pair with the working path 3-1 is accommodated in the 1.25 Gbps LO-ODU link 5-4 between the nodes A and C. The side end of the working path 3-1 at the node A and the side end of the protection path 4-1 at the node A are connected to the protection switch point 6A of the L2 switch 1A at the node A. The side end of the working path 3-1 at the node C and the side end of the protection path 4-1 at the node C are connected to the protection switch point 6C-1 of the L2 switch 1C at the node C. The working path 3-1 is accommodated in the link 5-2 at the node B from the link 5-1 via the L1 switch 2B and the L2 switch 1B.

The working path 3-2 is accommodated in the 1.25 Gbps LO-ODU link 5-2 between the nodes B and C. The protection path 4-2 that forms a pair with the working path 3-2 is accommodated in the 1.25 Gbps LO-ODU link 5-3 between the nodes B and C. The side end of the working path 3-2 at the node B and the side end of the protection path 4-2 at the node B are connected to the protection switch point 6B of the L2 switch 1B at the node B. The side end of the working path 3-2 at the node C and the side end of the protection path 4-2 at the node C are connected to the protection switch point 6C-2 of the L2 switch 1C at the node C.

According to the above-mentioned accommodation design processing from the L2 layer to the LO-ODU layer, in the LO-ODU link 5-1, 100 Mbps (working path 3-1; band occupied) in the 1.25 Gbps band is used. In the LO-ODU link 5-4, 100 Mbps (protection path 4-1; band reserved) in the 1.25 Gbps band is used. In the LO-ODU link 5-2, 200 Mbps (working paths 3-1, 3-2; band occupied) in the 1.25 Gbps band is used. In the LO-ODU link 5-3, 100 Mbps (protection path 4-2; band reserved) in the 1.25 Gbps band is used.

As described above, the first design unit 111 (Operation S1 in FIG. 6) executes the accommodation design processing based on the input traffic of 100 Mbps given between the nodes A and C and between the nodes B and C. As a result, as illustrated in FIG. 7, four protection-unapplied LO-ODU links 5-1 to 5-4 (4× unprotected ODU0) are acquired as outputs.

Subsequently, LO-ODU layer protection selection processing executed by (Operation S2 in FIG. 6) second design unit 112 and the accommodation design processing from the LO-ODU layer to the HO-ODU layer (Operation S1 in FIG. 6) will be described with reference to FIG. 7 through FIG. 10.

Figure 8:
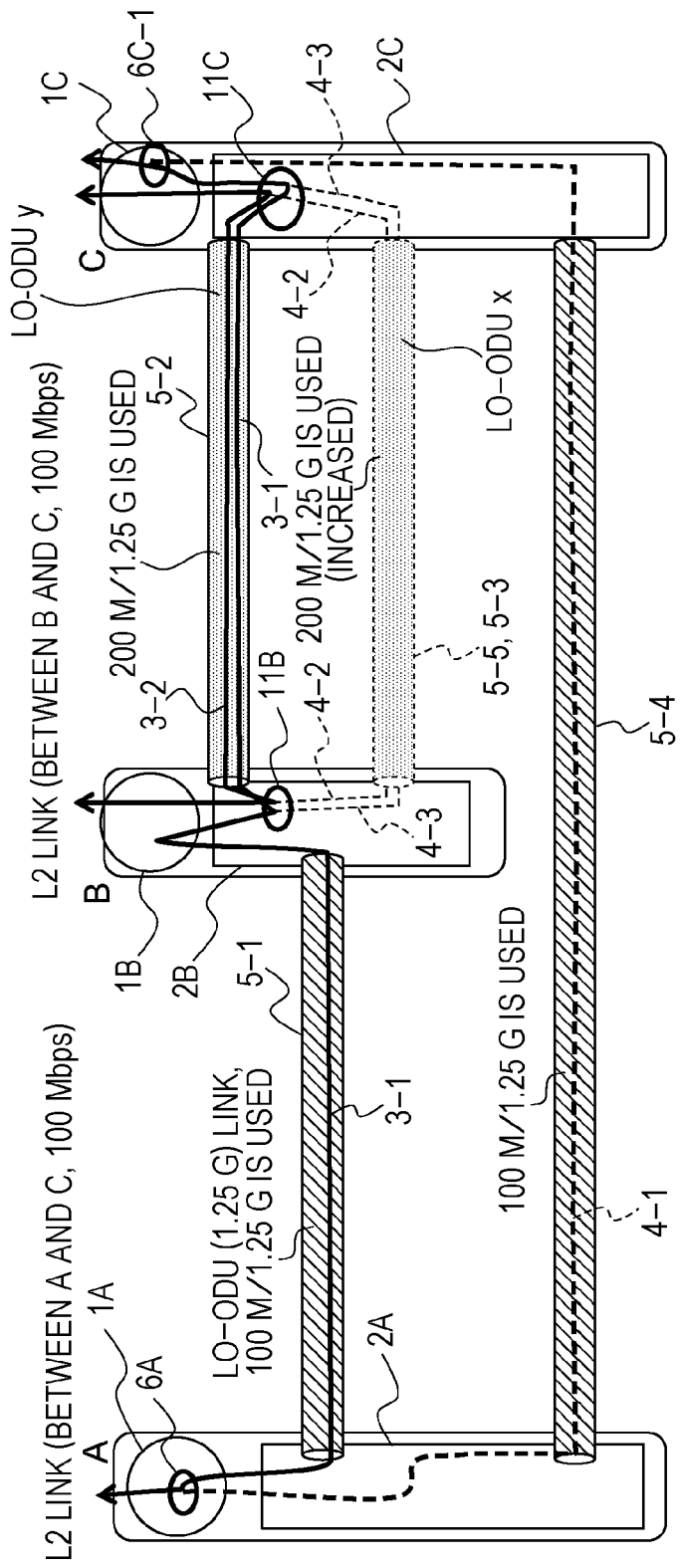
FIG. 8 is a view for illustrating the network design in First embodiment.

In the second design unit 112 (Operation S2 in FIG. 6), the accommodation design processing result (4× unprotected ODU0) acquired as illustrated in FIG. 7 is changed as illustrated in FIG. 8. Thereby, the pair of LO-ODU links 5-2 and 5-3 (LO-ODU y, x) that accommodate the L2 link between the nodes B and C are protected. Accordingly, a protection signal 4-3 corresponding to the section of the working signal 3-1 between the nodes A and B in the L2 link between the nodes A and C is accommodated only in the LO-ODU link 5-2 (LO-ODU y) in the example illustrated in FIG. 1 through FIG. 3, but is now accommodated in the LO-ODU link 5-3 (LO-ODU x) as well. As a result, the used band in the LO-ODU link 5-3 (LO-ODU x) becomes 200 Mbps, which is larger than that in the example illustrated in FIG. 1 and FIG. 7.

However, the second design unit 112 (Operation S2 in FIG. 6), as illustrated in FIG. 8, changes the LO-ODU x from the working LO-ODU link 5-3 to the protection LO-ODU link 5-5 that can be shared with other link. Thus, the LO-ODU link 5-5 and the protected LO-ODUb protection signal (protection path) 8 between the nodes B and C can share the band between the nodes B and C in the HO-ODUa (HO-ODU link 10-3) (refer to FIG. 9 and FIG. 10). As a result, as illustrated in FIG. 10, only one of 8 time slots (in the unit of 1.25 Gbps) in the HO-ODUa (ODU2) is consumed.

In the example illustrated in FIG. 1 through FIG. 3, all of the LO-ODU links 5-1 to 5-4 that accommodates the L2 link (paths 3-1, 3-2, 4-1, and 4-2) are unprotected links that occupy the band in the HO-ODU links 10-1 to 10-4. Thus, the number of time slots used in the HO-ODUa (HO-ODU link 10-3) is two. On the contrary, by applying shared protection as described above in First embodiment, the number of time slots used in the HO-ODUa (HO-ODU link 10-3) can be decreased from two to one.

The protection selection processing (Operation S2 in FIG. 6) and the accommodation design processing to the HO-ODU layer (Operation S1 in FIG. 6) will be described below in more detail. However, the case where one lower-order layer link y (third link 5-2) and one lower-order layer link x (fourth link 5-3) are selected as protected links will be described as an example in which shared protection can be readily applied in the lower-order layer. For this reason, in FIG. 7 through FIG. 11, it is assumed that the types of the lower-order layer links x, y are identical, for example, the types of the lower-order layer links x, y are the ODU0, and the bandwidths of the lower-order layer links x, y are identical (1.25 Gbps).

In the protection selection processing (Operation S2 in FIG. 6), the accommodation design processing result (4× unprotected ODU0) acquired by the first design unit 111 (Operation S1 in FIG. 6) is given as an input. In the protection selection processing (Operation S2 in FIG. 6), as illustrated in FIG. 8, the second design unit 112 acquires and outputs a pair of protected LO-ODU x, y and two unprotected LO-ODU links 5-1, 5-4.

At this time, the second design unit 112 extracts the links 5-3, 5-4 accommodating the paths that are all protection paths of the L2 link, as third link x, from the four unprotected links 5-1 to 5-4 generated by the first design unit 111 (see the processing P1). In the example illustrated in FIG. 7, all path accommodated in the LO-ODU link 5-3 is the protection path 4-2 of the L2 link, and all path accommodated in the LO-ODU link 5-4 is the protection path 4-1 of the L2 link.

Then, on each of the links 5-3 and 5-4 extracted as the third link x, the second design unit 112 searches for the link satisfying all of the predetermined protection application condition: C1 to C4 among the four unprotected links (second link) 5-1 to 5-4, as the fourth link y (see the processing P2).

Here, in the example illustrated in FIG. 7 and FIG. 8, satisfying the predetermined protection application condition means that all of the following conditions C1 to C4 are satisfied.

Condition C1: The initial node and the terminal node of the second link are identical to the initial node and the terminal node of the third link x. In the example illustrated in FIG. 7 and FIG. 8, since the initial and terminal nodes of the link 5-2 are the nodes B, C, respectively, and are identical to the initial and terminal nodes of the link 5-3 as the third link x, for the third link 5-3, the link 5-2 satisfies the condition C1.

Condition C2: The second link includes a part or whole of the working path corresponding to the protection path of the first link accommodated in the third link x. In the example illustrated in FIG. 7 and FIG. 8, since the link 5-2 includes the working path 3-2 corresponding to the protection path 4-2 of the first link accommodated in the link 5-3 as the third link x, for the third link 5-3, the link 5-2 satisfies the condition C2.

Condition C3: The type of the second link is identical to the type of the third link x. In the example illustrated in FIG. 7 and FIG. 8, since the type of the link 5-2 (bandwidth) is the ODU0 (bandwidth of 1.25 Gbps) and identical to the type of the link 5-3 as the third link x, for the third link 5-3, the link 5-2 satisfies the condition C3.

Condition C4: The second link and the third link x each have a band capable of accommodating a link group z in the sum-set of the first link accommodated in the second link and the first link accommodated in the third link x. In the example illustrated in FIG. 7 and FIG. 8, since the first link accommodated in the link 5-2 is the working paths 3-1 and 3-2, and the first link accommodated in the link 5-3 as the third link x is the protection path 4-2 corresponding to the working path 3-2. At this time, the link group z in the sum-set includes the working path 3-1 and 3-2 (200 Mbps), or the protection paths 4-1 and 4-2 (200 Mbps) corresponding to the working paths 3-1 and 3-2, respectively. Accordingly, since both the link 5-2 and link 5-3 have a free band and can accommodate the link group z in the sum-set, for the third link 5-3, the link 5-2 satisfies the condition C4.

In the processing P2, on the link 5-3 as the third link x, the second design unit 112 searches for the link 5-2 from the accommodation design processing result illustrated in FIG. 7 as the fourth link y that satisfies all protection application condition: C1 to C4.

When the plurality of fourth links y searched in the processing P2 are present, the second design unit 112 executes the processing P4 to select one fourth link y.

For example, as illustrated in FIG. 11A, on the third link LO-ODU x, it is assumed that two fourth links LO-ODU $y_1$ and LO-ODU $y_2$ are searched. At this time, it is assumed that three protection paths 4-1, 4-3, and 4-4 are accommodated in the LO-ODU x, two working paths 3-1, 3-2 are accommodated in the LO-ODU $y_1$, and two working paths 3-3, 3-4 are accommodated in the LO-ODU $y_2$. The protection paths 4-1, 4-3, and 4-4 form pairs with working paths 3-1, 3-3, 3-4, respectively. The protection paths 4-1, 4-3, and 4-4 in the LO-ODU x each are a 100 Mbps signal, and the LO-ODU x can form a pair with each of the LO-ODU $y_1$ and the LO-ODU $y_2$ to constitute the protected link.

In this case, the product-set x-$y_1$ of the protection paths (first link) 4-1, 4-3, and 4-4 accommodated in the LO-ODU x and the working paths (first link) 3-1, 3-2 accommodated in the LO-ODU $y_1$ is a pair of the protection path 4-1 and the working path 3-1, that is, one protected link. Accordingly, the total band x-$y_1$ of the product-set is 100 Mbps (the number of links is 2).

The product-set x-$y_2$ of the protection paths 4-1, 4-3, and 4-4 accommodated in the LO-ODU x and the working paths (first link) 3-3, 3-4 accommodated in the LO-ODU $y_2$ are a pair of the protection path 4-3 and the working path 3-3, and a pair of the protection path 4-4 and the working path 3-4, that is, 2. That is, two protected links. Accordingly, the total band of the product-set x-$y_2$ becomes 200 Mbps (the number of links is 2).

The second design unit 112 calculates the total band of the product-set x-$y_1$ and the total band of the product-set x-$y_2$. Then, the second design unit 112 selects the LO-ODU $y_2$ having the largest total band or the largest number of links of the product-sets x-$y_1$, x-$y_2$ from the two LO-ODU $y_1$ and LO-ODU $y_2$, as the working protected link in the LO-ODU (second layer). At this time, as illustrated in FIG. 11B, the second design unit 112 adds a protection path 4-1' corresponding to the protection path 4-1 in the LO-ODU x to the LO-ODU $y_2$, and uses the LO-ODU x and the LO-ODU $y_2$ as the protection protected link and the working protected link, respectively. The LO-ODU $y_1$ is used as the unprotected link.

The second design unit 112 selects the third link x and the fourth link (y or $y_2$) thus searched as a protection link and a working link for the protected link in the second layer (LO-ODU) (see the processing P3). At this time, in the second design unit 112, the accommodation design processing result (4× unprotected ODU0) acquired as illustrated in FIG. 7 is changed as illustrated in FIG. 8.

In the changed accommodation design processing result illustrated in FIG. 8, the protection path 4-3 corresponding to the working path 3-1 accommodated in the LO-ODU y between the nodes B and C is further accommodated in the LO-ODU x between the nodes B and C. The two protection paths 4-3, 4-2 accommodated in the LO-ODU x between the nodes B and C correspond to the working paths 3-1, 3-2 accommodated in the LO-ODU y between the nodes B and C, respectively. In this relation, the LO-ODU x between the nodes B and C is changed from the working link 5-3 to the protection link 5-5, and a pair of the LO-ODU x and the LO-ODU y becomes the protected links. That is, protection is applied to the pair of the LO-ODU x and the LO-ODU y in the LO-ODU layer. Accordingly, in the multi-layer network, the protection-applied link is transferred to the LO-ODU that is the lower-order layer.

In the changed accommodation design processing result illustrated in FIG. 8, with the application of protection to the LO-ODU x and the LO-ODU y, following changes are further made to the accommodation design processing result illustrated in FIG. 7. That is, the protection switch point 6B of L2SW1B at the nodes B is changed to a protection switch point 11B of L1SW2B at the node B. The protection switch point 6C-2 of L2SW1C at the node C is switched to a protection switch point 11C of L1SW2C at the node C. Here, the protection switch point 11B performs switching between the working path 3-2 and the protection path 4-2, and between the working path 3-1 and the protection path 4-3 in the LO-ODU layer at the node B. Similarly, the protection switch point 11C performs switching between the working path 3-2 and the protection path 4-2, and between the working path 3-1 and the protection path 4-3 in the LO-ODU layer at the node C.

In this manner, as illustrated in FIG. 8, the second design unit 112 (Operation S2 in FIG. 6) acquires a pair of protected LO-ODU x, y and two unprotected LO-ODU links 5-1 and 5-4, as a protection selection processing result. Then, the first design unit 111 (Operation S1 in FIG. 6) executes the accommodation design processing of the lower-order layer by using the second layer (layer i+1) including the protection selection processing result illustrated in FIG. 8 as the first layer (layer i).

Figure 9:
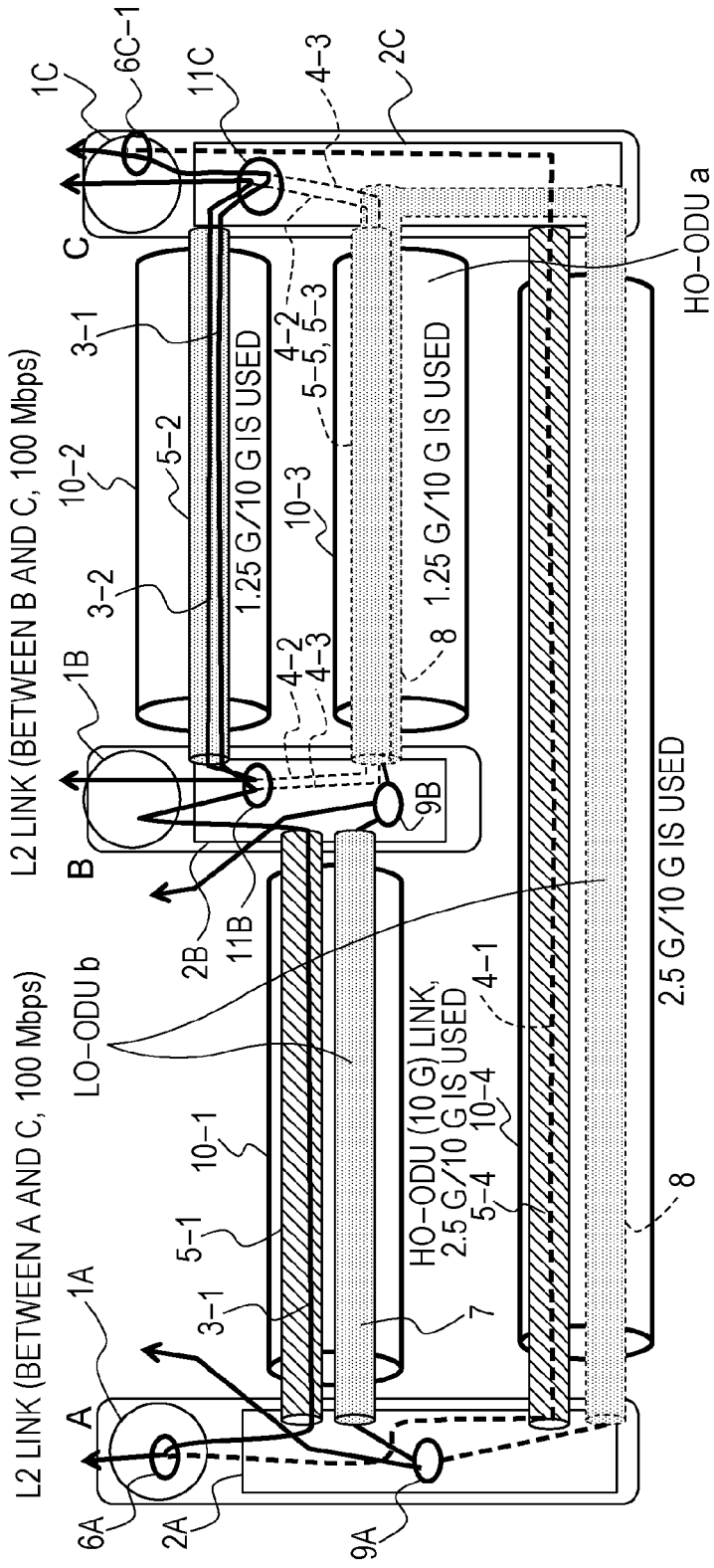
FIG. 9 is a view for illustrating the network design in First embodiment.
Figure 10:
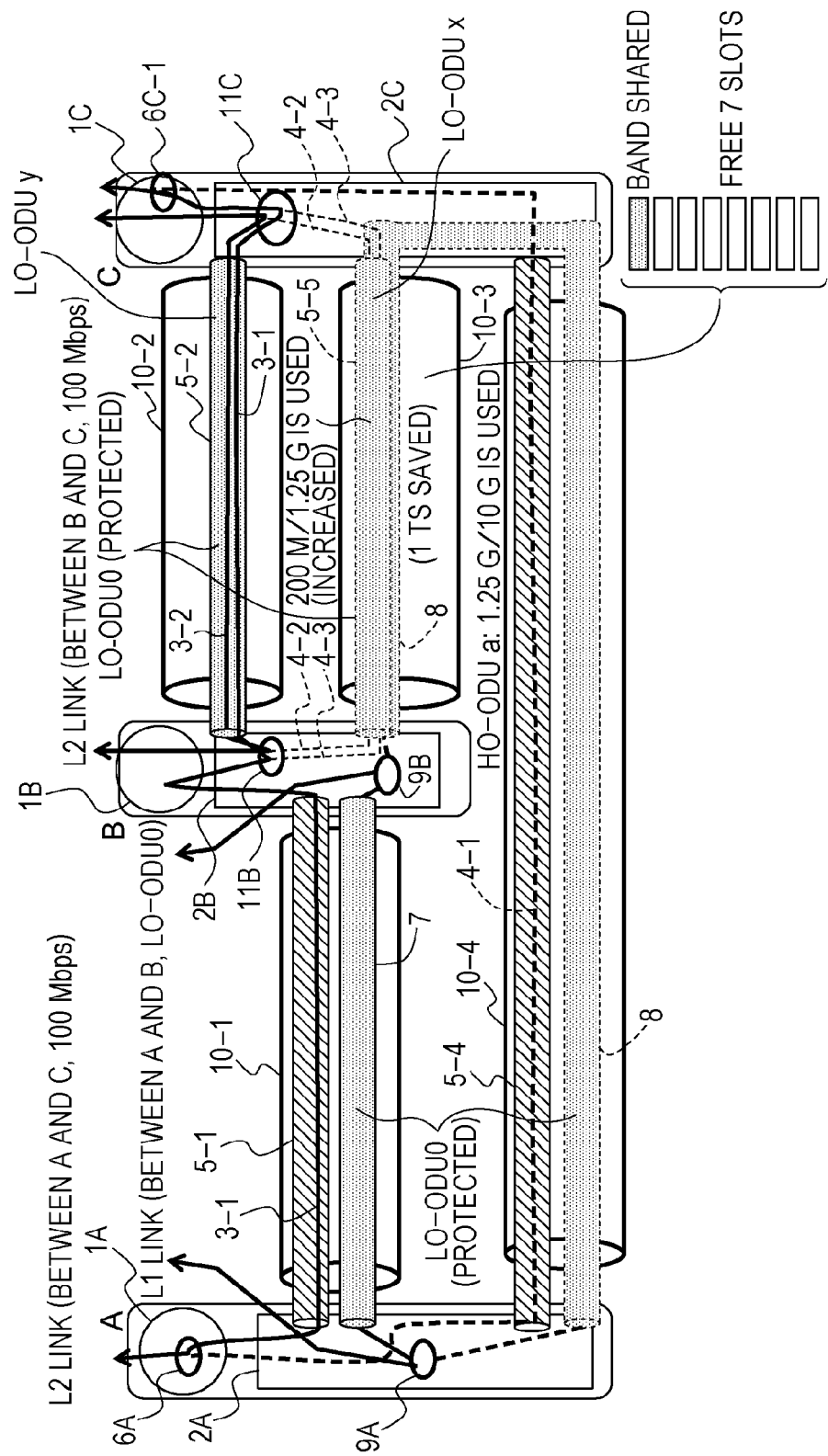
FIG. 10 is a view for illustrating the network design in First embodiment.

Subsequently, as illustrated in FIG. 9 and FIG. 10, the protection selection processing result (1× protected, 2× unprotected ODU0) acquired as illustrated in FIG. 8 and the LO-ODU layer demand are given as LO-ODU layer input traffic. Then, the first design unit 111 executes the accommodation design processing from the LO-ODU layer to the HO-ODU layer (Operation S1 in FIG. 6). The protection-applied ODU0 signal (1× protected ODU0) as the LO-ODU layer demand is given between the nodes A and B. In the second accommodation design processing, a protection-unapplied HO-ODU link in the HO-ODU lower than the LO-ODU, and the working path and the protection path of the LO-ODU link on the network configured of the HO-ODU link are generated based on the above-mentioned LO-ODU layer input traffic.

Specifically, in FIG. 9 and FIG. 10, a pair of working path 7 (ODU0) and protection path 8 (ODU0) constitute the protection-applied LO-ODU link (L1 link; LO-ODUb) between the nodes A and B. The LO-ODU link 5-1, 5-2, 5-4, 5-5, 7, and 8 are accommodated in the HO-ODU links 10-1 to 10-4 (ODU2) in the layer lower than the LO-ODU.

That is, the working LO-ODU link 7 is the ODU0 link between the nodes A and B, and the protection LO-ODU link 8 is the ODU0 link from the node A to the node B through the node C. The side end of the LO-ODU link 7 at the node A and the side end of the LO-ODU link 8 at the node A are connected to the protection switch point 9A of the L1 switch 2A at the node A. The side end of the LO-ODU link 7 at the node B and the side end of the LO-ODU link 8 at the node B are connected to the protection switch point 9B of the L1 switch 2B at the node B.

The two LO-ODU links 5-1 and 7 between the nodes A and B are accommodated in the protection-unapplied HO-ODU link 10-1 (ODU2). The LO-ODU link 5-2 (LO-ODU y) between the nodes B and C is accommodated in the protection-unapplied HO-ODU link 10-1 (ODU2). The LO-ODU links 5-4 and 8 between the nodes A and C are accommodated in the protection-unapplied HO-ODU link 10-4 (ODU2).

The LO-ODU link 5-5 (protection LO-ODU x) between the nodes B and C and the protection LO-ODU link 8 between the nodes B and C are accommodated in the protection-unapplied HO-ODU link 10-3 (ODU2; HO-ODUa). At this time, the protection LO-ODU link 5-5 and the protection LO-ODU link 8 can share the band between the nodes B and C in the HO-ODUa, as the LO-ODU link 5-2 and the LO-ODU link 7 that are working paths corresponding to the protection LO-ODU link 5-5 and the protection LO-ODU link 8 have no common section. Accordingly, shared protection is applied to the LO-ODU links 5-5 and 8. As a result, as illustrated in FIG. 10, only one slot in 8 time slots (in the unit of 1.25 Gbps) in the HO-ODUa (ODU2) is consumed.

In the example illustrated in FIG. 1 through FIG. 3, all LO-ODU links 5-1 to 5-4 accommodating the L2 link are unprotected links occupying the band in the HO-ODU links 10-1 to 10-4. Thus, the number of time slots used in the HO-ODU link 10-3 is two. On the contrary, in First embodiment, by applying as shared protection as illustrated in FIG. 9 and FIG. 10, the number of the time slots used in the HO-ODU link 10-3 can be decreased from two to one.

As described above, in First embodiment, the first design unit 111 executes the accommodation design processing based on the protection selection processing result acquired as illustrated in FIG. 8 and the LO-ODU layer demand. As a result, as illustrated in FIG. 9, four protection-unapplied HO-ODU links 10-1 to 10-4 (4× unprotected ODU2) are acquired as outputs. At this time, as illustrated in FIG. 9 and FIG. 10, the LO-ODU x, y between the nodes B and C are protected. Accordingly, in the accommodation design processing to the HO-ODU layer, shared protection can be applied to the LO-ODU x, 8 in the HO-ODU link 10-3 in the lower-order layer.

[3-3] Effects of First Embodiment

As described above, the network design apparatus 100 in First embodiment selects the protected link from the unprotected link in the lower-order layer generated based on traffics of the link in the concerned layer (upper order layer), according to the protection selection processing of the second design unit 112.

By repeatedly performing the above-mentioned procedure with reference to FIG. 7 through FIG. 10, the protected link can be transferred to the lower-order layer as much as possible. Therefore, in the multi-layer network environment, shared protection can be applied to the lowest possible layer. That is, the band can be shared in the unit of larger granularity, achieving network design with reduced network resource desired for accommodating traffics. Further, by applying shared protection to the lower-order layer, the effect of reducing the protection band is improved, and fault tolerance is partially improved depending on traffics.

[3-4] Network Design Operation in First Modification Example of First Embodiment Next, network design in a first modification example of First embodiment will be described with reference to FIG. 12. In First embodiment, as illustrated in FIG. 8 through FIG. 10, one lower-order layer link y (third link 5-2) and one lower-order layer link x (fourth link 5-3) are selected as the protected links. On the contrary, in the first modification example of First embodiment, as illustrated in FIG. 12, multiple (two in the figure) lower-order layer links $y_1$, $y_2$ (LO-ODU group y; fourth link group) and one lower-order layer link x (LO-ODU x; third link) are selected as the protected links.

In this case, the second design unit 112 executes the processing P2 using following protection application condition: C11 to C14 in place of the protection application condition: C1 to C4 in First embodiment. That is, on each link extracted as the third link x, the second design unit 112 searches for the second link group that satisfy all the protection application condition: C11 to C14 as a fourth link group y that becomes the working protected link.

Condition C11: Like the condition C1, the initial node and the terminal node of the second link are identical to the initial node and the terminal node of the third link x. In the example illustrated in FIG. 12A, two LO-ODU $y_1$, $y_2$ and one LO-ODU x satisfy the condition C11.

Condition C12: Like the condition C2, the second link includes a part or whole of the working path corresponding to the protection path of the first link accommodated in the third link x. In the example illustrated in FIG. 12A, two LO-ODU $y_1$, $y_2$ and one LO-ODU x satisfy the condition C12.

Condition C13: The total band of a plurality of second links (second link group) is identical to the band of the third link x. In the example illustrated in FIG. 12A, the type of the two LO-ODU $y_1$, $y_2$ is the LO-ODU0 (1.25 Gbps), and the total band is 2.5 Gbps. The type of the LO-ODU x is the LO-ODU1, and the band is 2.5 Gbps. Therefore, two LO-ODU $y_1$, $y_2$ and one LO-ODU x satisfy the condition C13.

Condition C14: The second link group and the third link x each have a band capable of accommodating a link group z in the sum-set of the first links accommodated in the plurality of second links and the first link accommodated in the third link x. In the example illustrated in FIG. 12A, the first link accommodated in the second link group y (links $y_1$, $y_2$) is the working path 3-1 to 3-4. The first link accommodated in the link x as the third link x is the protection paths 4-1, 4-4, and 4-5. At this time, the link group z in the sum-set includes the working path 3-1 to 3-5 (500 Mbps) or the protection path 4-1 to 4-5 (500 Mbps) corresponding to the working path 3-1 to 3-5, respectively. Therefore, since the link group y and the link x have free slots and can accommodate the link group z in the sum-set, two LO-ODU $y_1$, $y_2$ and one LO-ODU x satisfy the condition C14.

Accordingly, on the LO-ODU x illustrated in FIG. 12A, the second design unit 112 searches for the LO-ODU group y (links $y_1$, $y_2$) illustrated in FIG. 12A as the fourth link group (constituted of a plurality of fourth links) y that satisfies the protection application condition: C11 to C14.

Also in the first modification example, in the case where a plurality of searched fourth link groups are present, the second design unit 112 executes the same processing as the processing P4 in First embodiment to select one fourth link group.

That is, second design unit 112 selects a fourth link group having the largest total band or the largest number of links of a product-set of the first link accommodated in the third link x and the first link accommodated in each fourth link ($y_1$, $y_2$) from a plurality of fourth link groups as the working protected link in the LO-ODU layer (second layer). Specific processing at this time is the same processing executed defining each of the LO-ODU $y_1$ and the LO-ODU $y_2$ as one fourth link group in the processing P4 described with reference to FIG. 11, and detailed description thereof is omitted.

The second design unit 112 selects the third link x and the fourth link group y ($y_1$, $y_2$) thus searched as the protection protected link and the working protected link in the second layer (LO-ODU), respectively (see the processing P3). At this time, the second design unit 112 selects an integrated link Y that is formed by integrating the fourth link group y ($y_1$, $y_2$) into one and has the same band as the third link x, as the working protected link in the second layer. That is, in the second design unit 112, the accommodation design processing result acquired as illustrated in FIG. 12A is changed as illustrated in FIG. 12B.

In the example as illustrated in FIGS. 12A and 12B, the second design unit 112 integrates the fourth link group y ($y_1$, $y_2$; 2×ODU0) into one, and changes it to the LO-ODU y (the working integrated link) of the same type (here, ODU1) as the LO-ODU x. As illustrated in FIG. 12B, the second design unit 112 changes the LO-ODU x to the protection LO-ODU x. Then, the second design unit 112 adds traffics stored in each of the LO-ODU y, x so as not to increase the total band of the LO-ODU link. In the example illustrated in FIG. 12B, the working path 3-5 is added to the working LO-ODU y, and the protection paths 4-2, 4-3 corresponding to the working paths 3-2, 3-3 are added to the protection LO-ODU x.

Thereby, protection in the LO-ODU layer is applied to the pair of the LO-ODU y and the LO-ODU x, and in the multi-layer network, the protection-applied link is transferred to the LO-ODU that is the lower-order layer. Therefore, the first modification example of First embodiment can achieve the same effect as that in First embodiment.

[3-5] Network Design Operation in Second Modification Example of First Embodiment Next, referring to FIG. 13, network design in a second modification example of First embodiment will be described. In the first modification example of First embodiment, as illustrated in FIG. 12, a plurality of lower-order layer links $y_1$, $y_2$ (LO-ODU group y; fourth link group) and one lower-order layer link x (LO-ODU x; third link) are selected as the protected links. On the contrary, in the second modification example in First embodiment, multiple (two in the figures) lower-order layer links $y_1$, $y_2$ (LO-ODU group y; fourth link group) and multiple (two in the figure) lower-order layer links $x_1$, $x_2$ (LO-ODU group x; third link group) as illustrated in FIG. 13 are selected as the protected links.

In this case, in the processing P1, the second design unit 112 extracts the second link accommodating paths that are all protection paths of the first link from a plurality of unprotected second links (lower-order layer link), as the third link. At this time, the second design unit 112 extracts a plurality of third links (third link group) having the same path information and initial and terminal nodes from the extracted third link. In the example illustrated in FIG. 13A, a set of LO-ODU group x including two LO-ODU $x_1$, $x_2$ is extracted as the third link group.

The second design unit 112 executes the processing P2 using following protection application condition: C21 to C24 in place of the protection application condition: C1 to C4 in First embodiment. That is, on each of one or more third link groups x extracted in the processing P1, the second design unit 112 searches for the second link group that satisfies all of the protection application condition: C21 to C24 as the fourth link group y that is the working protected link.

Condition C21: The initial node and the terminal node of the second link are identical to the initial node and the terminal node of the third link group x. In the example illustrated in FIG. 13A, two LO-ODU $y_1$, $y_2$ and one LO-ODU group x satisfy the condition C21.

Condition C22: The second link includes a part or whole of the working path corresponding to the protection path of the first link accommodated in the third link group x. In the example illustrated in FIG. 13A, two LO-ODU $y_1$, $y_2$ and one LO-ODU x satisfy the condition C22.

Condition C23: The total band of a plurality of second links (second link group) is identical to the total band of the third link group x. In the example illustrated in FIG. 13A, the type of the two LO-ODU $y_1$, $y_2$ is the LO-ODU0 (1.25 Gbps), and the total band is 2.5 Gbps. The type of the two LO-ODU $x_1$, $x_2$ included in the LO-ODU group x is LO-ODU0 (1.25 Gbps), and the total band is 2.5 Gbps. Therefore, the two LO-ODU $y_1$, $y_2$ and one LO-ODU group x satisfy the condition C23.

Condition C24: The second link group and the third link group x each have the band capable of accommodating the link group z in the sum-set of the first link accommodated in the second link group and the first link accommodated in the third link group x. In the example illustrated in FIG. 13A, the first link accommodates in the second link group y (link $y_1$, $y_2$) is the working paths 3-1 to 3-4. The first link accommodated in the third link group x is the protection paths 4-1, 4-4, and 4-5. At this time, the link group z in the sum-set is the working paths 3-1 to 3-5 (500 Mbps), or the protection paths 4-1 to 4-5 (500 Mbps) corresponding to the working paths 3-1 to 3-5, respectively. Therefore, the second link group y and the third link group x have free slots and can accommodate the link group z in the sum-set, the two LO-ODU $y_1$, $y_2$ and one LO-ODU group x satisfy the condition C24.

Accordingly, on the LO-ODU group x illustrated in FIG. 13A, the second design unit 112 searches for the LO-ODU group y (links $y_1$, $y_2$) illustrated in FIG. 13A as the fourth link group (constituted of a plurality of fourth links) y that satisfy the protection application condition: C21 to C24.

Also in the second modification example, a plurality of searched fourth link groups are present, the second design unit 112 executes the same processing as the processing P4 in First embodiment to select one fourth link group.

That is, second design unit 112 selects a fourth link group having the largest total band or the largest number of links of a product-set of the first link accommodated in the third link x and the first link accommodated in each fourth link ($y_1$, $y_2$) among a plurality of fourth link groups as the working protected link in the LO-ODU layer (second layer). Specific processing at this time is the same processing executed defining each of the LO-ODU $y_1$ and the LO-ODU $y_2$ as one fourth link group, and defining the LO-ODU x as one third link group x in the processing P4 described with reference to FIG. 11, and detailed description thereof is omitted.

The second design unit 112 selects the third link group x ($x_1$, $x_2$) and the fourth link group y ($y_1$, $y_2$) thus searched as the protection protected link and the working protected link in the second layer (LO-ODU) respectively (see the processing P3). That is, the second design unit 112 selects one first integrated link LO-ODU x formed by integrating the third link group x ($x_1$, $x_2$) and one second integrated link LO-ODU y formed by integrating the fourth link group y ($y_1$, $y_2$) as the protection and the working protected link in the second layer (LO-ODU), respectively. At this time, the LO-ODU x and the LO-ODU y have the same band capable of accommodating the link group z in the sum-set. Specifically, the second design unit 112 changes the accommodation design processing result acquired as illustrated in FIG. 13A to the processing as illustrated in FIG. 13B.

In the example illustrated in FIGS. 13A and 13B, the second design unit 112 integrates the third link group x ($x_1$, $x_2$; 2×ODU0) into one LO-ODU x (LO-ODU1; 2.5 Gbps), and the integrated LO-ODU x (first integrated link) is changed to the protection LO-ODU x. The second design unit 112 integrates the fourth link group y ($y_1$, $y_2$; 2×ODU0) into one LO-ODU y (working second integrated link) of the same type (here, ODU1) as the LO-ODU x. Then, the second design unit 112 adds traffics accommodated in each of LO-ODU x, y so as not to increase the total band of the LO-ODU links. In the example illustrated in FIG. 13B, the working path 3-5 is added to the working LO-ODU y, and the protection paths 4-2, 4-3 corresponding to the working path 3-2, 3-3 are added to the protection LO-ODU x.

Thereby, the pair of LO-ODU y and LO-ODU x are protected in the LO-ODU layer, and the protection-applied link is transferred to the LO-ODU as the lower-order layer in the multi-layer network. Therefore, the second modification example of First embodiment can achieve the same effect as that of First embodiment.

[4] Second Embodiment

[4-1] Summary of Second Embodiment

Next, referring FIG. 14 through FIG. 17, summary of Second embodiment will be describing while comparing with the design result in First embodiment. FIG. 14 is a view for illustrating design result in First embodiment, and FIG. 15 through FIG. 17 are views for illustrating the design result in Second embodiment.

The second design unit 112 in First embodiment selects the third link x and the fourth link y that satisfy the predetermined protection application condition from the design result by the first design unit 111, as the protection protected link and the working protected link in the LO-ODU layer. At this time, in the case where the LO-ODU x, y are selected as illustrated in FIG. 14A, the second design unit 112 changes the LO-ODU x, y in FIG. 14A as illustrated in FIG. 14B to apply protection.

In the changed design result illustrated in FIG. 14B, the protection path 4-2 corresponding to the working path 3-2 accommodated in the LO-ODU y is accommodated in the LO-ODU x. Thereby, the two protection paths 4-1, 4-2 accommodated in the LO-ODU x correspond to the working paths 3-1, 3-2 accommodated in the LO-ODU y, respectively. As a result, the LO-ODU x is changed from the working link to the protection link, and the pair of LO-ODU x and LO-ODU y becomes the protected links. That is, the pair of LO-ODU x and LO-ODU y are protected in the LO-ODU layer.

Considering the case where the first design unit 111 acquires a design result illustrated in FIG. 15A, for example. In the example illustrated in FIG. 15A, the working paths 3-1, 3-2 are accommodated in the LO-ODU y, the protection path 4-1 corresponding to the working path 3-1, and the protection paths 4-3, 4-4 are accommodated in the LO-ODU $x_1$, and the protection path 4-5 is accommodated in the LO-ODU $x_2$.

In this case, in First embodiment, based on the above-mentioned protection application condition, it is determined whether or not y and $x_1$ or y and $x_2$ can form a protection pair (protected pair) without replacing the path accommodated in each link. At this time, in the example illustrated in FIG. 15A, it is determined that either the pair of y and $x_1$ or the pair of y and $x_2$ does not form the protection pair.

However, even in the case of the design result to which protection is not applied in First embodiment as illustrated in FIG. 15A, protection can be applied by changing an accommodation destination link that accommodates the protection path as illustrated in FIG. 15B. That is, in the example illustrated in FIG. 15B, the protection path 4-1 corresponding to the working path 3-1 is accommodated in the LO-ODU $x_1$, and the protection path 4-2 corresponding to the working path 3-2 is further accommodated. The LO-ODU $x_1$ is changed to the protection ling of the same type (same band) as the LO-ODU y. The remaining protection paths 4-3 to 4-5 are accommodated in unprotected LO-ODU $x_2$. Thereby, in the example illustrated in FIG. 15B, protection is applied to the pair of the LO-ODU y and the LO-ODU $x_1$ in the LO-ODU layer.

Even in the case where protection is not transferred in First embodiment as illustrated in FIG. 15A, Second embodiment enables protection transfer as illustrated in FIG. 15B. That is, in Second embodiment, as illustrated in FIG. 16, all traffics (paths) accommodated in the link group between the same nodes are targeted, the traffic are reaccommodated in the link group so as to maximize the protection-applied amount (the number of paths, the total band of paths, and so on) at the underlying layer.

For example, for the design result illustrated in FIG. 16A (the same design result as in FIG. 15A), in Second embodiment, first, all paths 3-1, 3-2, 4-1, 4-3 to 4-5 accommodated in the LO-ODU y, $x_1$, $x_2$ between the same nodes, as the design result, are taken out and collected as illustrated in FIG. 16B. After that, as illustrated in FIG. 16C, the paths 3-1, 3-2, 4-1, and 4-3 to 4-5 are reaccommodated in the LO-ODU y, $x_1$, $x_2$ so as to maximize the protection-applied amount (the number of paths, the total band of paths, and so on).

In the example illustrated in FIG. 16C, the working paths 3-1, 3-2 are reaccommodated in the LO-ODU y, the protection path 4-1 is reaccommodated in the LO-ODU $x_1$, and the protection paths 4-3 to 4-5 are reaccommodated in the LO-ODU $x_2$. Further, the protection path 4-2 corresponding to the working path 3-2 is accommodated in the LO-ODU $x_1$, and the LO-ODU $x_1$ is changed to the protection link of the same type (the same band) as the LO-ODU y. FIG. 16C illustrates the same design result as in FIG. 15B.

However, merely maximizing the protection-applied amount increases the total band of the link after application of protection. For example, considering the case where the first design unit 111 acquires a design result illustrated in FIG. 17A. In the example illustrated in FIG. 17A, the working paths 3-1, 3-2 are accommodated in the LO-ODU y, and the protection path 4-5 is accommodated in the LO-ODU x. Here, it is assumed that the type of the LO-ODU y is ODU0, that is, the band is 1.25 Gbps.

In this case, as illustrated in FIG. 17B, all of the paths 3-1, 3-2, and 4-5 accommodated in the LO-ODU y, x between the same nodes are taken out and collected as illustrated in FIG. 16B. After that, when the paths 3-1, 3-2, and 4-5 are reaccommodated in the LO-ODU y, x so as to maximize the protection-applied amount, for example, a design result illustrated in FIG. 17C is acquired.

In the example illustrated in FIG. 17C, the working paths 3-1, 3-2 are reaccommodated in the LO-ODU y, and a protection path 4-5' corresponding to the protection path 4-5 is further accommodated. The LO-ODU y is changed from the ODU0 (1.25 Gbps) to the ODU1 (2.5 Gbps). The protection path 4-5 is accommodated in the LO-ODU x, the protection paths 4-1, 4-2 corresponding to the working paths 3-1, 3-2 are further accommodated, and the LO-ODU x is changed to the protection link of the same type (same band) as the LO-ODU y.

Merely maximizing the protection-applied amount in this manner increases the total band of 2.5 Gbps given as input data to 5 Gbps as illustrated in FIG. 17C.

Thus, in Second embodiment, as described below, traffics are reaccommodated in each link so as to maximize the protection-applied amount and so as not to allow the number of links (band) after reaccommodation to exceed the number of links (band) at input.

[4-2] Functional Configuration in Second Embodiment

Figure 18:
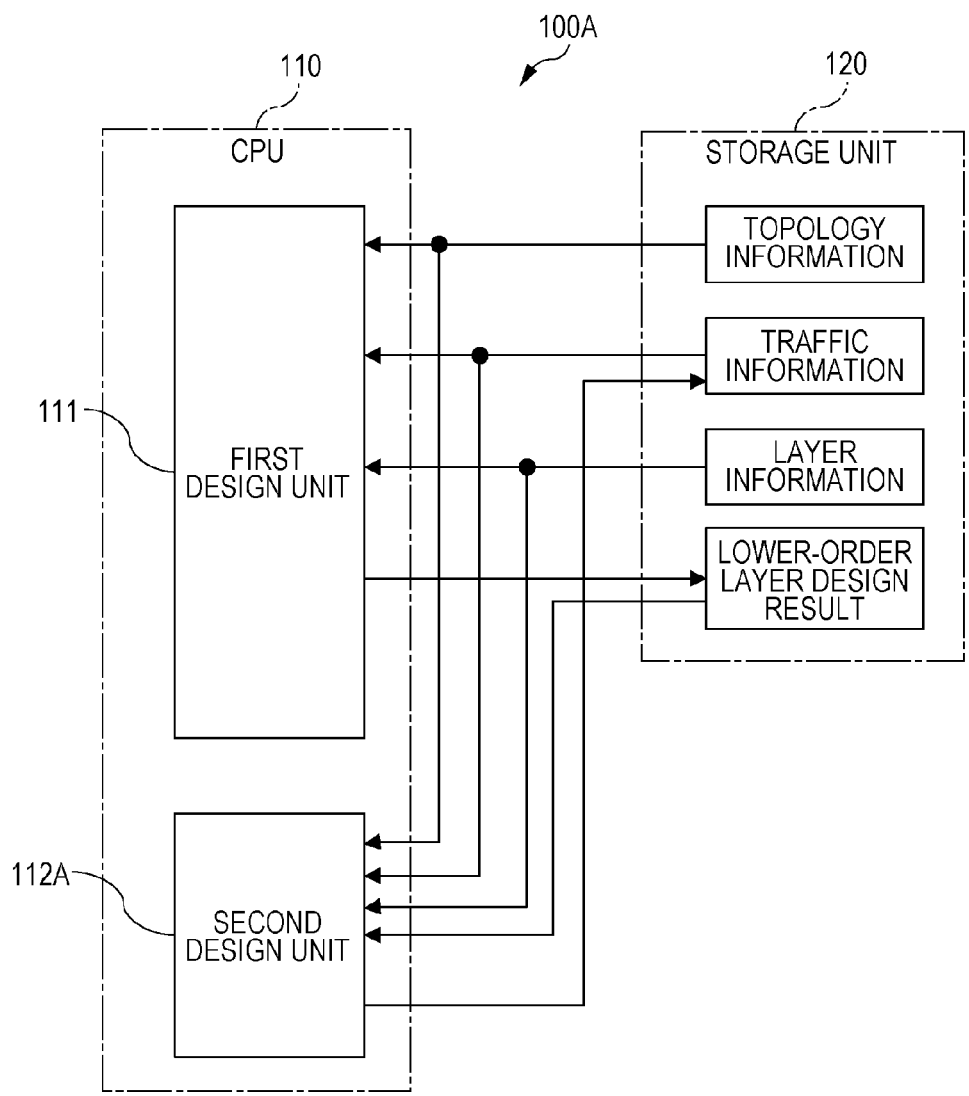
FIG. 18 is a block diagram illustrating an example of functional configuration of a network design apparatus in Second embodiment.

Next, referring to FIG. 18, an example of functional configuration of the network design apparatus 100A in Second embodiment will be described. FIG. 18 is a block diagram illustrating the functional configuration. As illustrated in FIG. 18, the network design apparatus 100A in Second embodiment has the same configuration as the network design apparatus 100 in First embodiment in FIG. 5 except that, the second design unit 112A is provided in Second embodiment in place of the second design unit 112 in First embodiment.

Also in the network design apparatus 100A in Second embodiment, the CPU 110 executes the network design program as described above to function as the first design unit 111 and the second design unit 112A.

Figure 19:
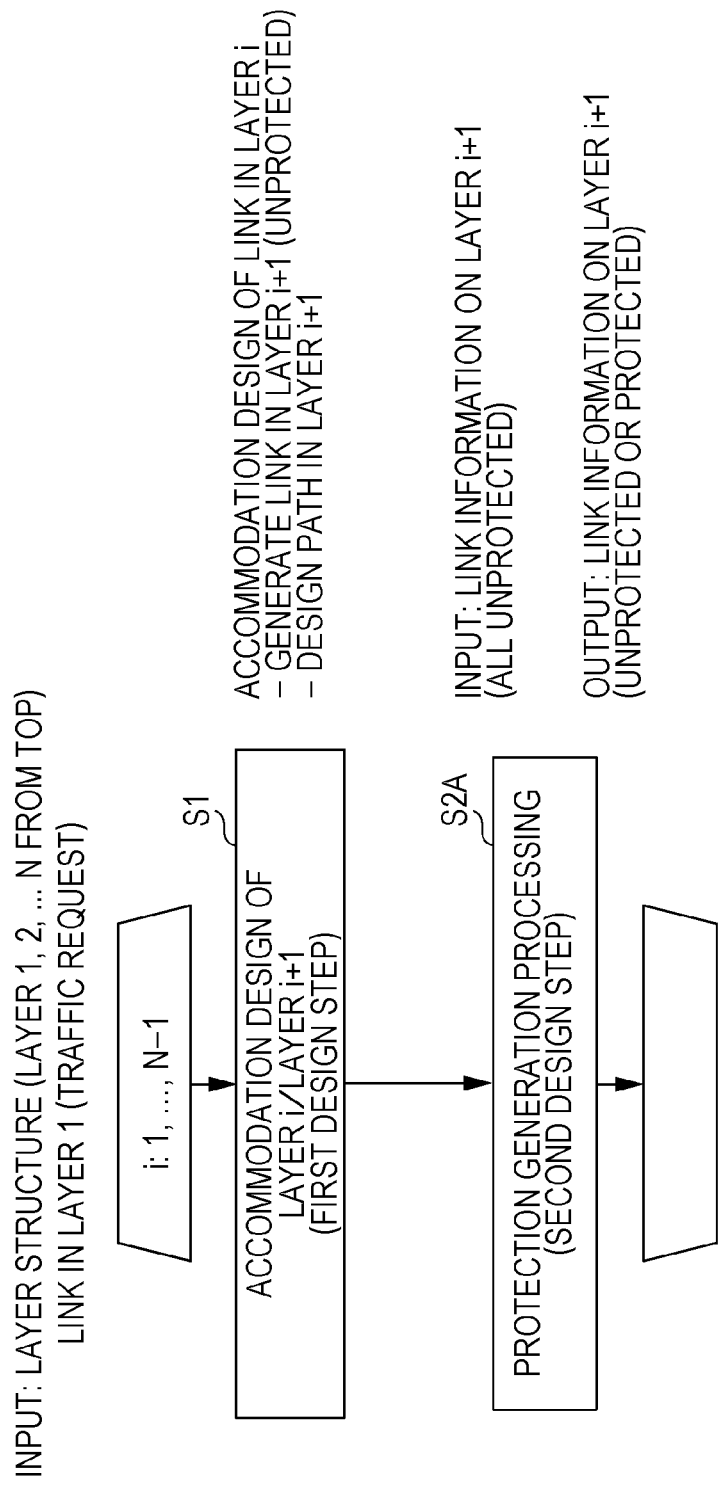
FIG. 19 is a flow chart illustrating a procedure of network design in Second embodiment.

Here, the first design unit 111 executes the same accommodation design processing as in First embodiment based on the topology information, the traffic information, and the layer information in storage unit 120 (see Operation 51 in FIG. 19). That is, as in the accommodation design processing of the first design unit 111 in Second embodiment, the unprotected second link in the layer i+1 lower than the layer i is generated, and the working path and the protection path of the first link upper than the second link. A result of the accommodation design processing of the first design unit 111 is stored in the storage unit 120 as a lower-order layer design result. A specific example of the accommodation design processing of the first design unit 111 is the same as that in First embodiment.

Then, the second design unit 112A in Second embodiment executes following protection application processing based on the topology information, the traffic information, the layer information, and the lower-order layer design result in storage unit 120 (see Operation S2A in FIG. 19). In the protection application processing, based on the unprotected second link, and the working path and the protection path of the first link, which are generated by the first design unit 111, the protected link in the second layer is generated from the unprotected second link.

Especially, the second design unit 112A in Second embodiment sequentially executes following processing P10, P20 in protection generation processing as the protection application processing.

Processing P10: The second design unit 112A classifies the unprotected link generated by the first design unit 111 according to the initial and terminal nodes and paths. That is, a node pair to which the protected link can be applied is extracted.

Processing P20: For all of the working paths and protection paths (traffics) in the first layer, which are accommodated in a plurality of second links (second link group) having the same initial and terminal nodes and the same path, the second design unit 112A executes following processing of each node pair extracted in the processing P10. That is, the second design unit 112A reaccommodated the working paths and the protection paths of a plurality of reaccommodation destination links (reaccommodation destination link group) in the second layer so as to maximize the total band of the protection-applied links in the second layer, that is, to maximize the protection-applied amount. At this time, the second design unit 112A generates the reaccommodation destination link group so as not to allow the total band of the reaccommodation destination link group to exceed the total band of the second link group. The second design unit 112A executes reaccommodation design processing by integer linear programming (ILP). More specifically, the processing P20 includes following processing P21 and P22.

An integer programming question solved by Integer Linear Programming has a solution that minimizes or maximizes a predetermined function value according to one or more constraint conditions. Especially in Second embodiment, as described later, a solution that maximizes the number of protection-applied pairs (function value) is found according to a constraint condition ([total band of used candidate links]≤[band A+ϵ (where, $A=\Sigma_j A_j$)]).

Processing P21: On the second link group, the second design unit 112A generates a plurality of reaccommodation destination link candidates as candidates for the reaccommodation destination link group.

Processing P22: The second design unit 112A reaccommodates the working paths and the protection paths of the first layer accommodated in the second link group in the plurality of reaccommodation destination link candidates so as to maximize the number of combinations of link candidate pairs (link pair candidates) that satisfy a predetermined protection application condition.

Satisfying the predetermined protection application condition used in the processing P22 in Second embodiment means that satisfying all of the following conditions C31 to C33.

Condition C31: Each of the working path and the protection path is assigned to one of the plurality of reaccommodation destination link candidates.

Condition C32: Each reaccommodation destination link candidate can accommodate the assigned path set.

Condition C33: The link candidate pair is formed of the same type (same band) of two link candidates among the plurality of reaccommodation destination link candidates, and the two link candidates each can accommodate a sum-set of the paths assigned to the two link candidates.

[4-3] Network Design Operation in Second Embodiment

Next, referring to FIG. 19 through FIG. 27, the network design operation of the network design apparatus 100A in Second embodiment will be described. First, referring to a flow chart (Operations S1, S2A) in FIG. 19, a procedure of network design in Second embodiment will be described.

As illustrated in FIG. 19, as in First embodiment, the multi-layer network designed by the network design apparatus 100A in Second embodiment also has layer 1, 2, . . . , N (N is an integer of 3 or more) from the top. The network design apparatus 100A receives information on the above-mentioned layer structure and the link in the layer 1 (traffic request, input traffic) as input information. Then, network design apparatus 100A repeatedly executes following processing in Operation S1 and Operation S2A from the upper order layer toward the lower-order layer.

First, the first design unit 111 executes the accommodation design processing of the link (first link) in the layer i (first layer; i=1, 2, . . . , N−1) that is the upper order layer (Operation S1; first design operation). That is, the unprotected link (second link) in the lower-order layer i+1 (second layer) that accommodates the link in the layer i is generated, and path design in the layer i+1 is made. The processing in Operation S1 is the same as that in First embodiment and thus, description thereof is omitted.

Then, the second design unit 112A executes the protection generation processing as the above-mentioned protection application processing based on information on the unprotected link in the layer i+1, which is acquired in Operation S1 (Operation 52A; second design operation). That is, the processing P10 and P20 (processing P21, P22) is executed to generate the protected link from the unprotected link (second link) in the layer i+1 and output information on the unprotected link or the protected link in the layer i+1. As in First embodiment, the information on the unprotected link or the protected link in the layer i+1, which is acquired in Operation S2A, i+1 being replaced with i, is inputted to the first design unit 111, and the accommodation design processing of the link in the lower-order layer is executed (Operation S1).

Figure 20:
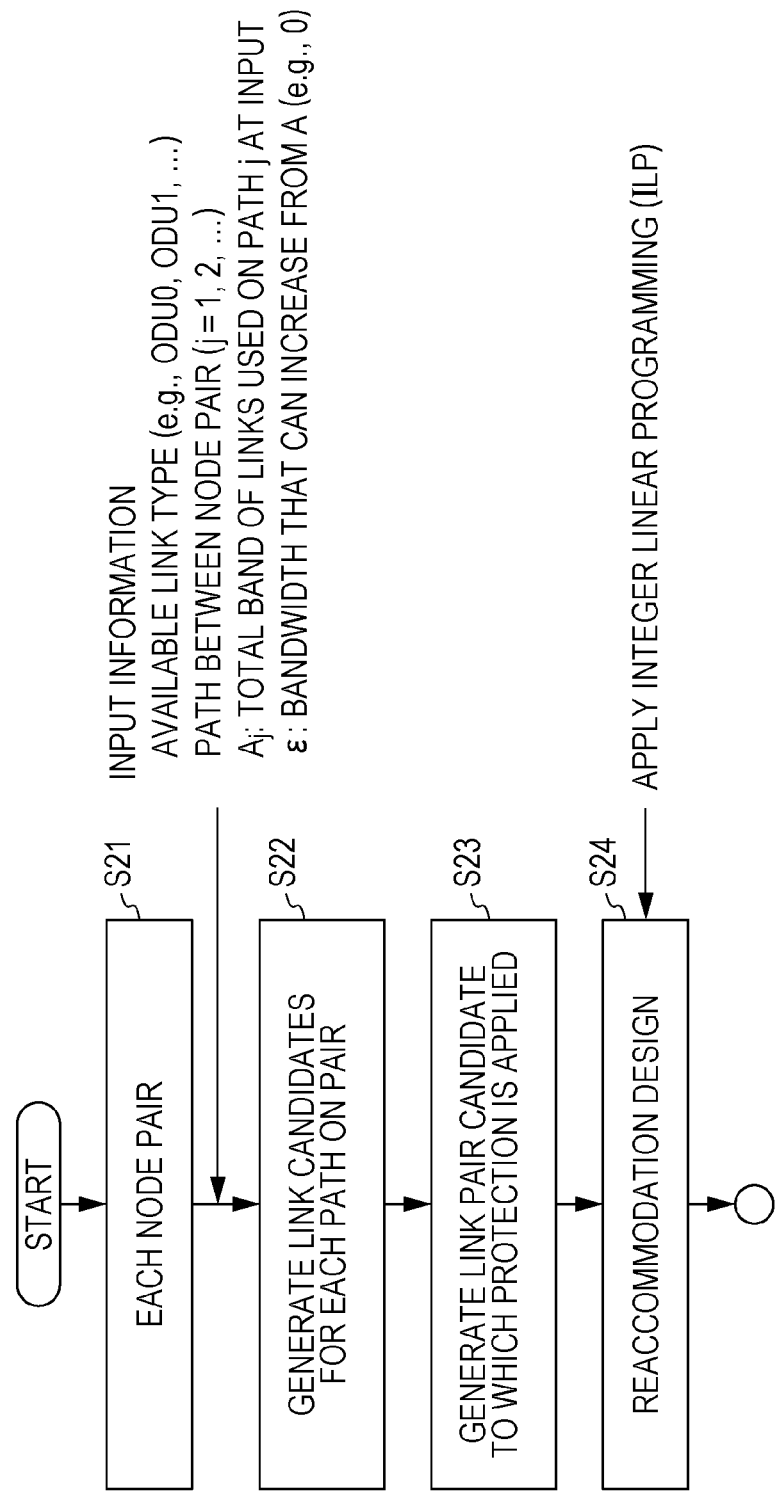
FIG. 20 is a flow chart illustrating the protection generation processing in FIG. 19.

Next referring to a flow chart (Operation S21 to S24) in FIG. 20, the protection generation processing executed in Operation S2A will be described.

On each node pair classified and extracted in the processing P10 (Operation S21), the second design unit 112A executes Operations S22 to S24. At this time, on each node pair, available link type (for example, ODU0, ODU1, . . . ), the path between the node pair (j=1, 2, . . . ), total band $A_j$ of the link used on a path j at input (working path/protection path), and a bandwidth ϵ that can increase from the total band $A_j$ (for example, 0) are given as input information.

Then, the second design unit 112A executes the processing P21 to generate a link candidates (reaccommodation destination link candidates) for each path on the pair (between each node pair) (Operation S22). The link candidate generation processing in Operation S22 will be described later with reference to FIG. 21 and FIG. 22.

The second design unit 112A generates the link pair candidate to which protection is applied (pair candidate, link candidate pair) from the link candidate generated in Operation S22 (Operation S23). The link pair candidate generation processing in Operation S23 will be described later with reference to FIG. 23 and FIG. 24.

Then, the second design unit 112A executes the processing P22 to apply ILP (integer linear programming) to the pair candidate generated in Operation S23, executing the reaccommodation design processing (Operation S24).

Figure 21:
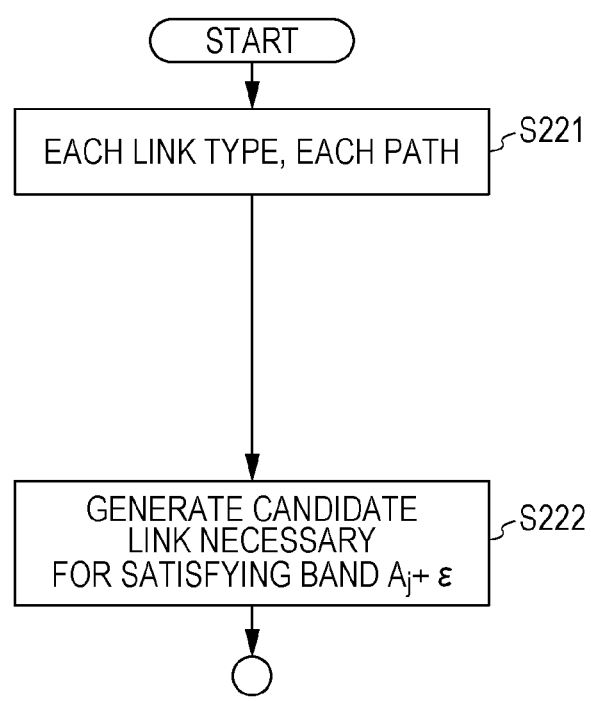
FIG. 21 is a flow chart illustrating the link candidate generation processing in FIG. 20.

Next, referring to a flow chart in FIG. 22 (Operations S221, S222) in FIG. 21, the link candidate generation processing (Operation S23 in FIG. 20) will be described.

The second design unit 112A generates candidate links (accommodation destination link candidates) that are desired for satisfying the band $A_j+\epsilon$ (Operation S222) for each link type and each path given as the input information (Operation S221).

FIG. 22 illustrates a specific example of link candidate generation. In the example illustrated in FIG. 22A, it is assumed that available link types ODU0, ODU1 (the band of the ODU0 is 1, and the band of the ODU1 is 2), paths 1, 2, $A_1=1$, $A_2=2$, $\epsilon=0$ are given as input information. It is assumed that the path 1 includes one ODU0 link x, and path 2 includes two ODU0 links $y_1$, $y_2$. The working paths 3-1, 3-2 are accommodated in a link y in of the path 1, the protection path 4-1 corresponding to the working path 3-1 and the protection paths 4-3, 4-4 are accommodated in a link $x_1$ of the path 2, and the protection path 4-5 is accommodated in a link $x_2$ of the path 2.

In the example illustrated in FIG. 22A (link type, path), the candidate links y, $x_1$ to $x_3$ illustrated in FIG. 22B are generated as candidate links desired for satisfying the band $A_j+\epsilon$. That is, for each link type, the maximum number of candidate links are generated such that the total band does not exceed the band $A_j+\epsilon$. Specifically, for the path 1, one ODU0 candidate link y is generated, and for the path 2, two ODU0 candidate links $x_1$, $x_2$ and one ODU1 candidate link $x_3$ are generated.

Figure 23:
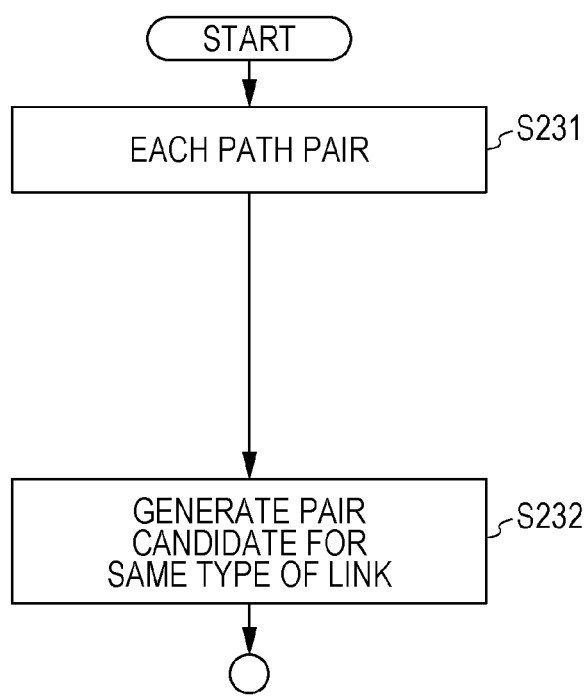
FIG. 23 is a flow chart illustrating the link pair candidate generation processing in FIG. 20.

Next, according to a flow chart (Operation S231, S232) in FIG. 23, the link pair candidate generation processing (Operation S23 in FIG. 20) will be described with reference to FIG. 24.

The second design unit 112A generates a link pair candidate, to which protection is applied, from the link candidate thus generated (Operation S232) for each path pair (Operation S231). That is, the pair of the same type among pairs of the candidate links included in the path 1 and the candidate links included in the path 2 is generated as the link pair candidate to which protection is applied.

FIG. 24 illustrates a specific example of generation of the ink pair candidate. In the case where the candidate links are generated as illustrated in FIG. 22B, as illustrated in FIG. 24, a pair of the candidate link y in the path 1 and the candidate link $x_1$ in the three candidate links in the path 2 is generate as the link pair candidate. Each candidate link has only to form a pair with at least one candidate link among candidate links in each path other than the path of its own.

Next, referring to FIG. 25 through FIG. 27, the reaccommodation design processing (Operation S24 in FIG. 20) will be described.

The second design unit 112A receives the reaccommodation destination link candidate information generated in Operation S22 and the link pair candidate information generated in Operation S23 as input information. Then, the second design unit 112A reaccommodates the traffics for all of the working paths and the protection paths (traffics) in the first layer in the reaccommodation destination link candidates based on the reaccommodation destination link candidate information and the link pair candidate information. In the example illustrated in FIG. 22, as illustrated in FIG. 25, a traffic demand in the path 1 includes the working paths 3-1, 3-2, and a traffic demand in the path 2 includes the protection path 4-1 corresponding to the working path 3-1 and the protection paths 4-3 to 4-5.

At this time, the second design unit 112A accommodates each traffic demand (each of the working paths 3-1, 3-2 and the protection paths 4-1, 4-3 to 4-5) in the candidate link in the path 1 or 2. When each pair candidate satisfies the predetermined condition: C31 to C33, the second design unit 112A applies protection to the pair candidate. In the reaccommodation design processing, a function of maximizing the number of protection-applied pairs is set as an objective function, and [total band of used candidate links]≤[band A+ϵ (where, $A=\Sigma_j A_j$)] is set as a constraint condition. According to the constraint condition, a solution of maximizing the number of protection-applied pairs (combination of link pair) is found by integer linear programming (ILP). The number of protection-applied pairs corresponds to the total band of the protection-applied links, that is, the protection-applied amount.

In the example illustrated in FIG. 26, the candidate links y, $x_1$ are selected as the link pair candidate, the working paths 3-1, 3-2 are reaccommodated in the candidate link y, and the protection path 4-1 corresponding to the working path 3-1 is reaccommodated in the candidate link $x_1$. The remaining protection paths 4-3 to 4-5 are reaccommodated in the candidate link $x_2$. This leads to $A_1=1$, $A_2=2$, $\epsilon=0$, and the band $A+\epsilon=3+0=3$. Since the total band of the used links is 3, the above-mentioned constraint condition is satisfied.

Figure 27A:
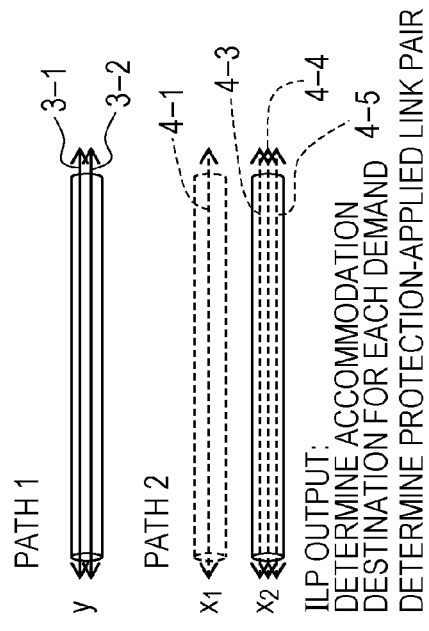
FIGS. 27A, 27B, and 27C are views illustrating the reaccommodation design processing in FIG. 20.

In the example (pair candidate y, $x_1$) illustrated in FIG. 27A that is the same as FIG. 26, the conditions C31 to C33 are satisfied, and the second design unit 112A determines that protection can be applied to the pair candidate y, $x_1$. That is, the traffic demands accommodated in each of the candidate links y, $x_1$ can be made common. In other words, demands accommodated in the candidate links y, $x_1$ (working path or protection path) can be set to the sum-set of the demands accommodated in the candidate links y, $x_1$. Specifically, as illustrated in FIG. 27C, the demands accommodated in the link y can be set to the working paths 3-1, 3-2, the demands accommodated in the link $x_1$ can be set to the protection paths 4-1, 4-2 corresponding to the working paths 3-1, 3-2.

Figure 27B:
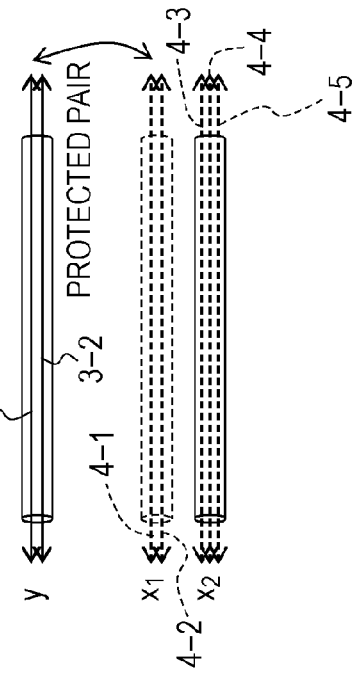
Figure 27C:
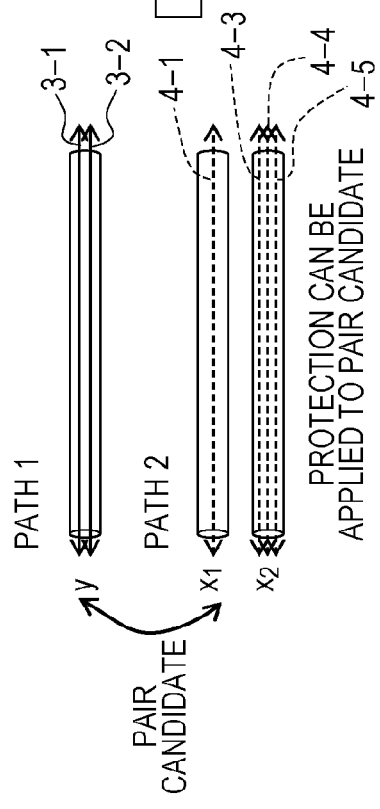

As a result, as illustrated in FIG. 27B, the second design unit 112A outputs a reaccommodation result as illustrated in FIG. 27B as an output of ILP. That is, as illustrated in FIG. 27B, the link $x_1$ becomes the protection link corresponding to the working link y, and the pair of the link y and the link $x_1$ becomes the protected links. As illustrated in FIG. 27C, the protection path 4-2 corresponding to the working path 3-2 is further accommodated in the link $x_1$.

[4-4] Effects of Second Embodiment

Even in the case where protection is not applied in First embodiment as illustrated in FIG. 15A and FIG. 22A, in Second embodiment, protection can be applied to the links in the lower-order layer with a larger band. Thus, by repeatedly executing the procedure in Second embodiment, more protected links can be transferred to lowest possible layer.

Therefore, in the multi-layer network environment, shared protection can be applied in the lowest possible layer. That is, band sharing in the unit of larger granularity becomes possible, achieving network design with reduced network resource desired for accommodating traffics. Moreover, by applying shared protection in the lower-order layer, the effect of reducing the protection band is improved, and fault tolerance is partially improved depending on traffics.

At this time, merely maximizing the protection-applied amount increases the total band given as the input data as illustrated in FIG. 17C. However, in Second embodiment, by providing the above-mentioned constraint condition, the reaccommodation design processing of maximizing the protection-applied amount such that the number of links (band) after reaccommodation does not exceed the number of links (band) at input.

[5] Others

Although the preferred embodiments have been described in detail, the embodiments are not limited to such specific embodiments and may be variously modified and implemented so as not to deviate from the subject matter of the disclosure.

Although the number of layers N in the multi-layer network is 3 in the embodiments, N is not limited to 3, and may be 4 or more, which can achieve the same effect as in the above-mentioned embodiments. However, in this case, according to the number of layers, Operations S1 and S2 in FIG. 6 or Operations S1 and S2A in FIG. 19 are repeated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network design apparatus, comprising:
   a memory; and
   a processor coupled to the memory and configured to execute:
   accommodation design processing of, based on a traffic of a protection-applied or protection-unapplied first link in a first layer, generating a protection-unapplied second link in a second layer lower than the first layer, and generating a working path and a protection path of the first link on a network configured of the second link, and
   protection application processing of, based on the protection-unapplied second link and the working path and the protection path of the first link that are generated in the accommodation design processing, selecting or generating a protection-applied link in the second layer from the protection-unapplied second link.

2. The network design apparatus according to claim 1, wherein
   in the protection application processing,
   the second link accommodating path that is all protection paths of the first link among the second links generated in the accommodation design processing is extracted as a third link,
   on the extracted third link, the second link that satisfies a predetermined protection application condition among the second links is searched for as a fourth link, and
   the third link and the fourth link are selected as the protection protection-applied link and the working protection-applied link in the second layer, respectively.

3. The network design apparatus according to claim 2, wherein
   the predetermined protection application condition is such that an initial node and a terminal node of the second link are identical to an initial node and a terminal node of the third link,
   the second link includes a part or whole of the working path corresponding to the protection path of the first link accommodated in the third link,
   a type of the second link is identical to a type of the third link, and
   the second link and the third link each have a band capable of accommodating a link group of a sum-set of the first link accommodated in the second link and the first link accommodated in the third link.

4. The network design apparatus according to claim 3, wherein
   in the case where a plurality of the fourth links are present, in the protection application processing, the fourth link having the largest total band or the largest number of links of a product-set of the first link accommodated in the third link and the first link accommodated in each of the fourth links is selected from the plurality of fourth links.

5. The network design apparatus according to claim 2, wherein
   the predetermined protection application condition is such that an initial node and a terminal node of the second link are identical to an initial node and a terminal node of the third link,
   the second link includes a part or whole of the working path corresponding to the protection path of the first link accommodated in the third link,
   a total band of a plurality of the second links (hereinafter referred to as second link group) is identical to a band of the third link, and
   the second link group and the third link each have a band capable of accommodating a link group of a sum-set of the first link accommodated in the second link and the first link accommodated in the third link, and
   in the protection application processing,
   the second link group that satisfy the predetermined protection application condition is searched for as a plurality of the fourth links (hereinafter referred to as fourth link group), and
   an integrated link that is formed by integrating the fourth link group into one and has the same band as the third link is selected as the working protection-applied link in the second layer.

6. The network design apparatus according to claim 5, wherein
   in the case where a plurality of the fourth link groups are present, in the protection application processing, the fourth link group having the largest total band or the largest number of links of a product-set of the first link accommodated in the third link and the first link accommodated in each of the fourth link groups is selected from the plurality of fourth link groups.

7. The network design apparatus according to claim 2, wherein
   in the protection application processing,
   a plurality of the third links (hereinafter referred to as third link group) having the same initial node and terminal node are extracted, and
   the predetermined protection application condition is such that an initial node and a terminal node of the second link are identical to the initial node and the terminal node of the third link group,
   the second link includes a part or whole of the working path corresponding to the protection path of the first link accommodated in the third link group,
   a total band of a plurality of the second links (hereinafter referred to as second link group) is identical to a total band of the third link group, and
   the second link group and the third link group each have a band capable of accommodating a link group of a sum-set of the first link accommodated in the second link group and the first link accommodated in the third link group, and
   in the protection application processing,
   the plurality of the second links that satisfy the predetermined protection application condition are searched as a plurality of the fourth links (hereinafter referred to as fourth link group),
   the third link group and the fourth link group are integrated into a first integrated link and a second integrated link having the same band capable of accommodating the link group of the sum-set, respectively, and the first integrated link and the second integrated link are selected as the protection protection-applied link and the working protection-applied link in the second layer, respectively.

8. The network design apparatus according to claim 7, wherein
in the case where a plurality of the fourth link groups are present, in the protection application processing, the fourth link group having the largest total band or the largest number of links of a product-set of the first link accommodated in the third link and the first link accommodated in each of the fourth link groups is selected from the plurality of fourth link groups.

9. The network design apparatus according to claim 1, wherein
the protection application processing,
the protection-unapplied second links generated in the accommodation design processing are classified according to initial and terminal nodes and paths, for all of the working paths and the protection paths, in the first layer, accommodated in a plurality of the classified second links (hereinafter referred to as second link group) having the same initial and terminal nodes and the same paths,
the working paths and the protection paths are reaccommodated in a plurality of reaccommodation destination links (hereinafter referred to as reaccommodation destination link group) in the second layer so as to maximize the total band of the protection-applied links in the second layer, and
the reaccommodation destination link group is generated such that a total band of the reaccommodation destination link group does not exceed the total band of the second link group.

10. The network design apparatus according to claim 9, wherein
in the protection application processing,
a plurality of reaccommodation destination link candidates as candidates for the reaccommodation destination link group of the second link group are generated, and
the working paths and the protection paths in the first layer accommodated in the second link group are reaccommodated in the plurality of reaccommodation destination link candidates so as to maximize the number of link candidate pairs that satisfy a predetermined protection application condition,
the predetermined protection application condition is such that the working path and the protection path each are assigned to one of the plurality of reaccommodation destination link candidates,
each reaccommodation destination link candidate can accommodate a path set assigned thereto, and
on the link candidate pair including the same type of two link candidates among the plurality of reaccommodation destination link candidates, the two link candidates can accommodate the path set assigned to the two link candidates.

11. The network design apparatus according to claim 1, wherein
in the accommodation design processing, the second layer including the protection-applied link acquired in the protection application processing is used as the first layer.

12. The network design apparatus according to claim 11, wherein
in the accommodation design processing, shared protection is applied to the protection-applied link.

13. The network design apparatus according to claim 1, wherein the traffic comprises information on input traffic in each of the first layer and the second layer.

14. A network design method for designing a lower-order layer that accommodates a traffic of an upper order layer in a multi-layer network, wherein
a computer performs:
a first design operation of executing accommodation design processing of, based on a traffic of a protection-applied or protection-unapplied first link in a first layer, generating a protection-unapplied second link in a second layer lower than the first layer, and generating a working path and a protection path of the first link on a network configured of the second link, and
a second design operation of executing protection application processing of, based on the protection-unapplied second link and the working path and the protection path of the first link that are generated in the first design operation, selecting or generating a protection-applied link in the second layer from the protection-unapplied second link.

15. The network design method according to claim 14, wherein
in the second design operation,
the computer:
extracts the second link accommodating paths that are all protection paths of the first link among the second links generated in the first design operation, as a third link,
on the extracted third link, searches for the second link that satisfies a predetermined protection application condition among the second links, as a fourth link, and
selects the third link and the fourth link as the protection protection-applied link and the working protection-applied link in the second layer, respectively.

16. The network design method according to claim 15, wherein
the predetermined protection application condition is such that
an initial node and a terminal node of the second link are identical to an initial node and a terminal node of the third link,
the second link includes a part or whole of the working path corresponding to the protection path of the first link accommodated in the third link,
a type of the second link is identical to a type of the third link, and
the second link and the third link each have a band capable of accommodating a link group of a sum-set of the first link accommodated in the second link and the first link accommodated in the third link.

17. The network design method according to claim 15, wherein
the predetermined protection application condition is such that an initial node and a terminal node of the second link are identical to an initial node and a terminal node of the third link,
the second link includes a part or whole of the working path corresponding to the protection path of the first link accommodated in the third link,
a total band of a plurality of the second link (hereinafter referred to as second link group) is identical to a band of the third link, and the second link group and the third link each have a band capable of accommodating a link group of a sum-set of the first link accommodated in the second link and the first link accommodated in the third link, and in the second design operation, the computer:

searches for the second link group that satisfies the predetermined protection application condition as a plurality of the fourth links (hereinafter referred to as fourth link group), and selects an integrated link that is formed by integrating the fourth link group into one and has the same band as the third link as the working protection-applied link in the second layer.

18. The network design method according to claim 15, wherein in the second design operation, the computer extracts a plurality of the third links (hereinafter referred to as third link group) having the same initial node and terminal node, and the predetermined protection application condition is such that an initial node and a terminal node of the second link are identical to the initial node and the terminal node of the third link, the second link includes a part or whole of the working path corresponding to the protection path of the first link accommodated in the third link group, a total band of a plurality of the second links (hereinafter referred to as second link group) is identical to a total band of the third link group, and the second link group and the third link group each have a band capable of accommodating a link group of a sum-set of the first link accommodated in the second link group and the first link accommodated in the third link group, and in the second design operation, the computer:

searches for the plurality of the second links that satisfy the predetermined protection application condition as a plurality of the fourth links (hereinafter referred to as fourth link group), integrates the third link group and the fourth link group into a first integrated link and a second integrated link having the same band capable of accommodating the link group of the sum-set, respectively, and selects the first integrated link and the second integrated link as the protection protection-applied link and the working protection-applied link in the second layer, respectively.

19. The network design method according to claim 14, wherein in the second design operation, the computer:

classifies the protection-unapplied second links generated in the first design operation according to initial and terminal nodes and paths, for all of the working paths and the protection paths in the first layer, the paths being accommodated in a plurality of the classified second links (hereinafter referred to as second link group) having the same initial and terminal nodes and the same paths, reaccommodates the working paths and the protection paths in a plurality of reaccommodation destination links (hereinafter referred to as reaccommodation destination link group) in the second layer so as to maximize the total band of the protection-applied links in the second layer, and generates the reaccommodation destination link group such that a total band of the reaccommodation destination link group does not exceed the total band of the second link group.

20. The network design method according to claim 19, wherein in the second design operation, the computer:

generates a plurality of reaccommodation destination link candidates as candidates for the reaccommodation destination link group of the second link group, and reaccommodates the working paths and the protection paths in the first layer accommodated in the second link group in the plurality of reaccommodation destination link candidates so as to maximize the number of link candidate pairs that satisfy a predetermined protection application condition, and the predetermined protection application condition is such that the working path and the protection path each are assigned to one of the plurality of reaccommodation destination link candidates, each reaccommodation destination link candidate can accommodate a path set assigned thereto, and on the link candidate pair including the same type of two link candidates among the plurality of reaccommodation destination link candidate, the two link candidates can accommodate the path set assigned to the two link candidates.

21. A non-transitory, computer-readable recording medium having stored therein a network design program for causing a computer to execute a process, the process comprising:

accommodation design processing of, based on a traffic of a protection-applied or protection-unapplied first link in a first layer, generating a protection-unapplied second link in a second layer lower than the first layer, and generating a working path and a protection path of the first link on a network configured of the second link, and protection application processing of, based on the protection-unapplied second link and the working path and the protection path of the first link that are generated in the accommodation design processing, selecting or generating a protection-applied link in the second layer from the protection-unapplied second link.

* * * * *